United States Patent
Akiyama

(10) Patent No.: US 7,680,015 B2
(45) Date of Patent: Mar. 16, 2010

(54) OPTICAL DISK APPARATUS COMPATIBLE WITH DIFFERENT TYPES OF MEDIUMS ADAPTED FOR DIFFERENT WAVELENGTHS

(75) Inventor: Hiroshi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/905,484

(22) Filed: Oct. 1, 2007

(65) Prior Publication Data

US 2008/0037399 A1   Feb. 14, 2008

Related U.S. Application Data

(60) Continuation of application No. 11/447,078, filed on Jun. 6, 2006, which is a division of application No. 10/284,385, filed on Oct. 31, 2002, now Pat. No. 7,088,645, which is a continuation of application No. 09/760,743, filed on Jan. 17, 2001, now abandoned, which is a division of application No. 09/112,346, filed on Jul. 9, 1998, now Pat. No. 6,195,315.

(30) Foreign Application Priority Data

| Jul. 11, 1997 | (JP) | 9-201055 |
| Jul. 16, 1997 | (JP) | 9-190948 |
| Jul. 31, 1997 | (JP) | 9-206656 |

(51) Int. Cl.
   *G11B 7/00* (2006.01)

(52) U.S. Cl. ............ 369/112.24; 369/120; 369/112.16; 369/112.28

(58) Field of Classification Search .............. 369/44.23, 369/44.37, 112.17, 112.24, 112.26; *G11B 7/00, G11B 7/095, 7/085, 7/13*
See application file for complete search history.

(56) References Cited

U.S. PATENT DOCUMENTS

| 4,333,173 A | 6/1982 | Yonezawa et al. |
| 4,399,529 A | 8/1983 | Leterme et al. |
| 4,546,463 A | 10/1985 | Opheij et al. |
| 4,609,258 A | 9/1986 | Adachi et al. |
| 4,804,835 A | 2/1989 | Ando |

(Continued)

FOREIGN PATENT DOCUMENTS

| EP | 0 777 219 | 4/1997 |

(Continued)

*Primary Examiner*—Joseph H Feild
*Assistant Examiner*—Joseph Haley
(74) *Attorney, Agent, or Firm*—Dickstein Shapiro LLP

(57) ABSTRACT

A polarizing beam splitter for separating an upstream beam from a downstream beam according to the polarization of an incident beam is provided between first and second light sources emitting laser beams at respective wavelength and an objective lens. A phase plate for providing a phase difference to a beam incident on the polarizing beam splitter is provided between the polarizing beam splitter and the light sources. A portion of the laser beam incident on the polarizing beam splitter is reflected by the polarizing beam splitter and caused to be incident on a photo-detecting unit, so as to prevent an unnecessary portion of the laser beam is incident on the photo-detecting unit. According to the invention, the laser beam is used efficiently and the cost of fabricating an optical disk apparatus is reduced by eliminating a need for a gain controlling circuit in the photo-detecting unit.

6 Claims, 23 Drawing Sheets

U.S. PATENT DOCUMENTS

| | | | |
|---|---|---|---|
| 4,954,702 A | 9/1990 | Kurogama et al. | |
| 4,968,874 A | 11/1990 | Kasuga | |
| 5,020,041 A * | 5/1991 | Nakao et al. | 369/13.17 |
| 5,144,616 A | 9/1992 | Yasukawa et al. | |
| 5,239,414 A | 8/1993 | Reno | |
| 5,337,302 A | 8/1994 | Gotoh et al. | |
| 5,359,588 A | 10/1994 | Fujita et al. | |
| 5,361,244 A | 11/1994 | Nakamura et al. | |
| 5,410,531 A | 4/1995 | Tsujioka | |
| 5,477,386 A | 12/1995 | Okuda et al. | |
| 5,491,675 A | 2/1996 | Kay | |
| 5,568,315 A | 10/1996 | Shuman | |
| 5,606,181 A | 2/1997 | Sakuma et al. | |
| 5,615,200 A | 3/1997 | Hoshino et al. | |
| 5,671,207 A | 9/1997 | Park | |
| 5,696,749 A | 12/1997 | Brazas, Jr. et al. | |
| 5,696,750 A | 12/1997 | Katayama | |
| 5,703,856 A | 12/1997 | Hayashi et al. | |
| 5,717,678 A | 2/1998 | Akiyama | |
| 5,745,465 A | 4/1998 | Tsai et al. | |
| 5,748,602 A | 5/1998 | Chao et al. | |
| 5,790,502 A | 8/1998 | Horinouchi et al. | |
| 5,790,503 A | 8/1998 | Mizuno et al. | |
| 5,856,965 A | 1/1999 | Tsuchiya et al. | |
| 5,872,760 A | 2/1999 | Kim et al. | |
| 5,881,043 A | 3/1999 | Hasegawa et al. | |
| 5,917,801 A | 6/1999 | Lee | |
| 5,923,636 A | 7/1999 | Haruguchi et al. | |
| 5,953,162 A | 9/1999 | Blankenbecler | |
| 5,982,732 A | 11/1999 | Yamanaka | |
| 5,986,996 A | 11/1999 | Kitamura et al. | |
| 5,986,998 A | 11/1999 | Park | |
| 6,005,835 A | 12/1999 | Tsuiji et al. | |
| 6,014,359 A | 1/2000 | Nagano | |
| 6,052,236 A | 4/2000 | Nakasuji et al. | |
| 6,081,497 A | 6/2000 | Seong | |
| 6,084,845 A | 7/2000 | Mizuno | |
| 6,091,691 A | 7/2000 | Yoo et al. | |
| 6,115,345 A | 9/2000 | Kato et al. | |
| 6,240,053 B1 * | 5/2001 | Akiyama | 369/44.23 |
| 6,330,112 B1 | 12/2001 | Kaise et al. | |

FOREIGN PATENT DOCUMENTS

| | | |
|---|---|---|
| JP | 57-181441 | 11/1982 |
| JP | 61-24823 | 2/1986 |
| JP | 61-254915 | 11/1986 |
| JP | 63-257945 | 10/1988 |
| JP | 63-262614 A | 10/1988 |
| JP | 1-109317 | 4/1989 |
| JP | 64-089044 | 4/1989 |
| JP | 01-244421 | 9/1989 |
| JP | 04-079050 | 3/1992 |
| JP | 4-305615 | 10/1992 |
| JP | 6-259804 | 9/1994 |
| JP | 06-274931 | 9/1994 |
| JP | 08-055363 | 2/1996 |
| JP | 08-279177 | 10/1996 |
| JP | 09-044885 | 2/1997 |

* cited by examiner

F I G. 1 3
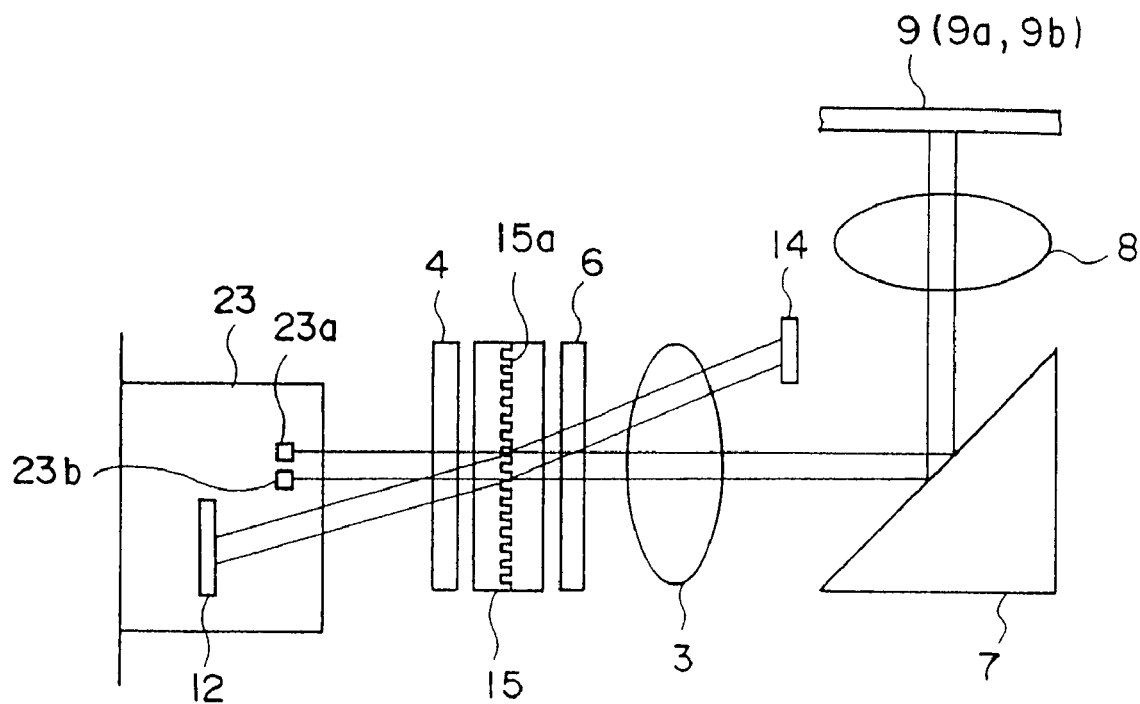
F I G. 1 4
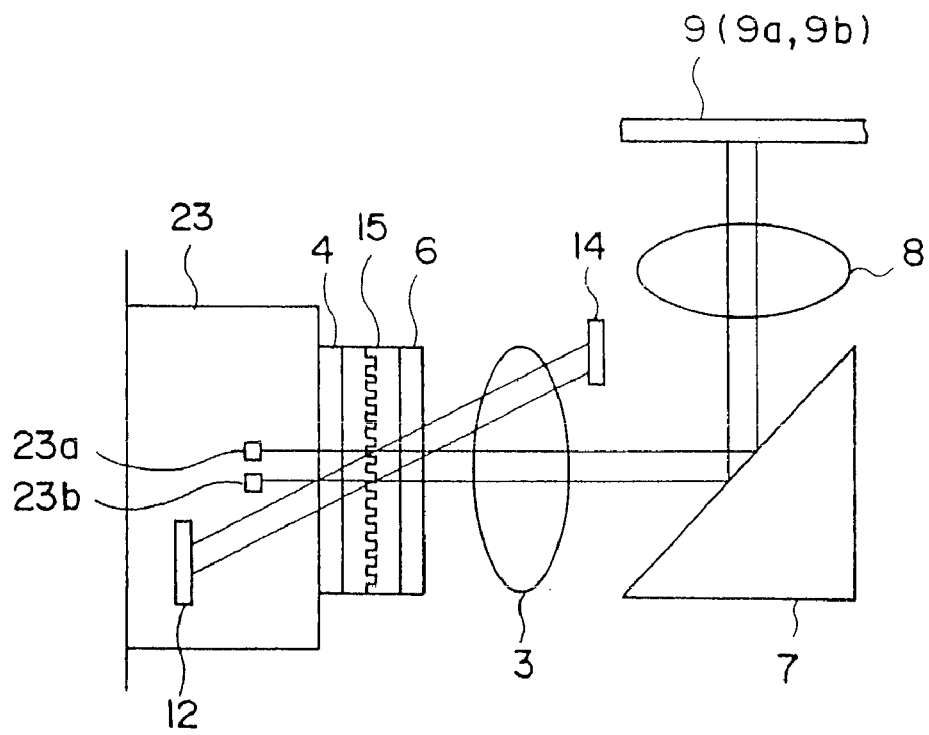

(TE MODE EMISSION)

(TM MODE EMISSION)

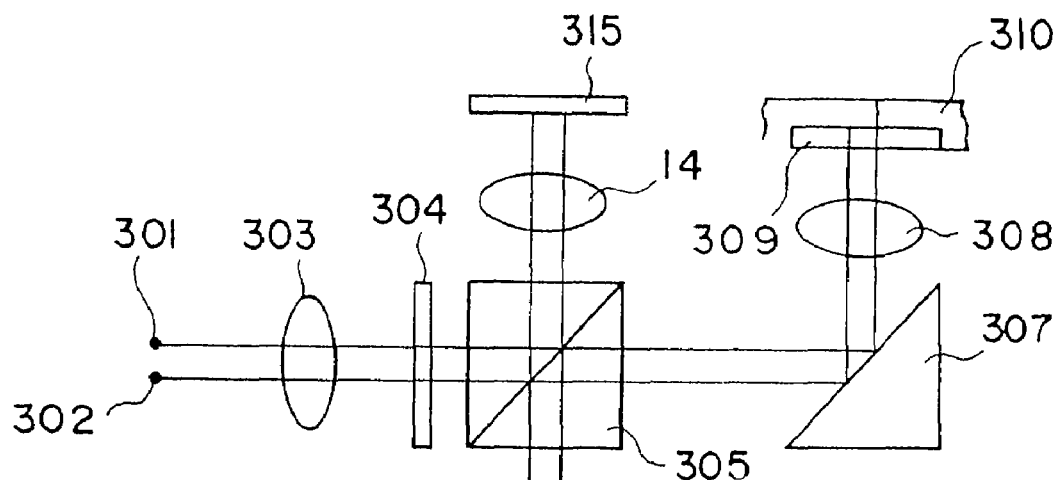
FIG. 26A
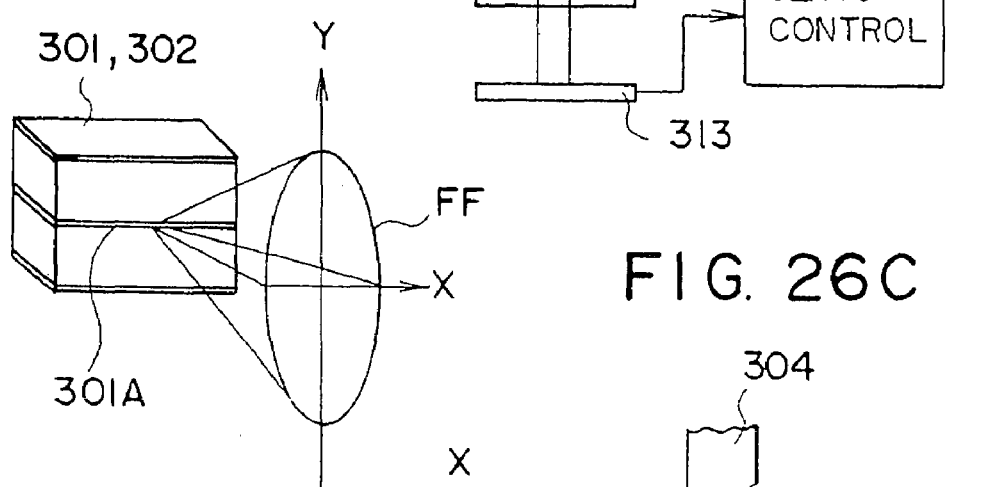
FIG. 26B
FIG. 26C
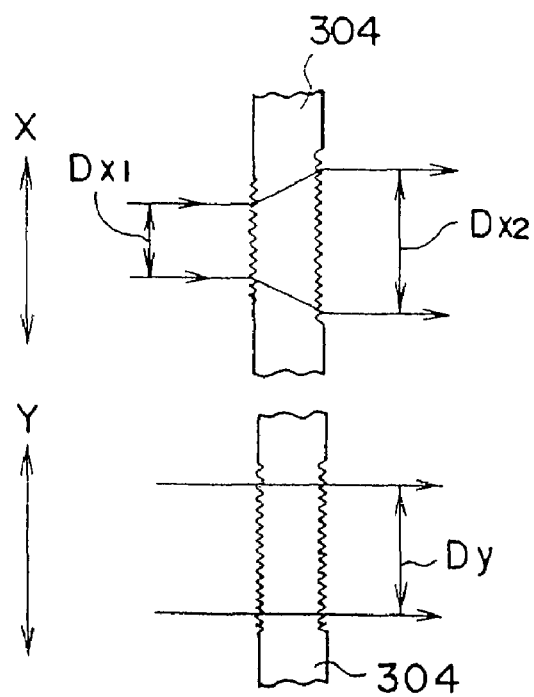

F I G. 33
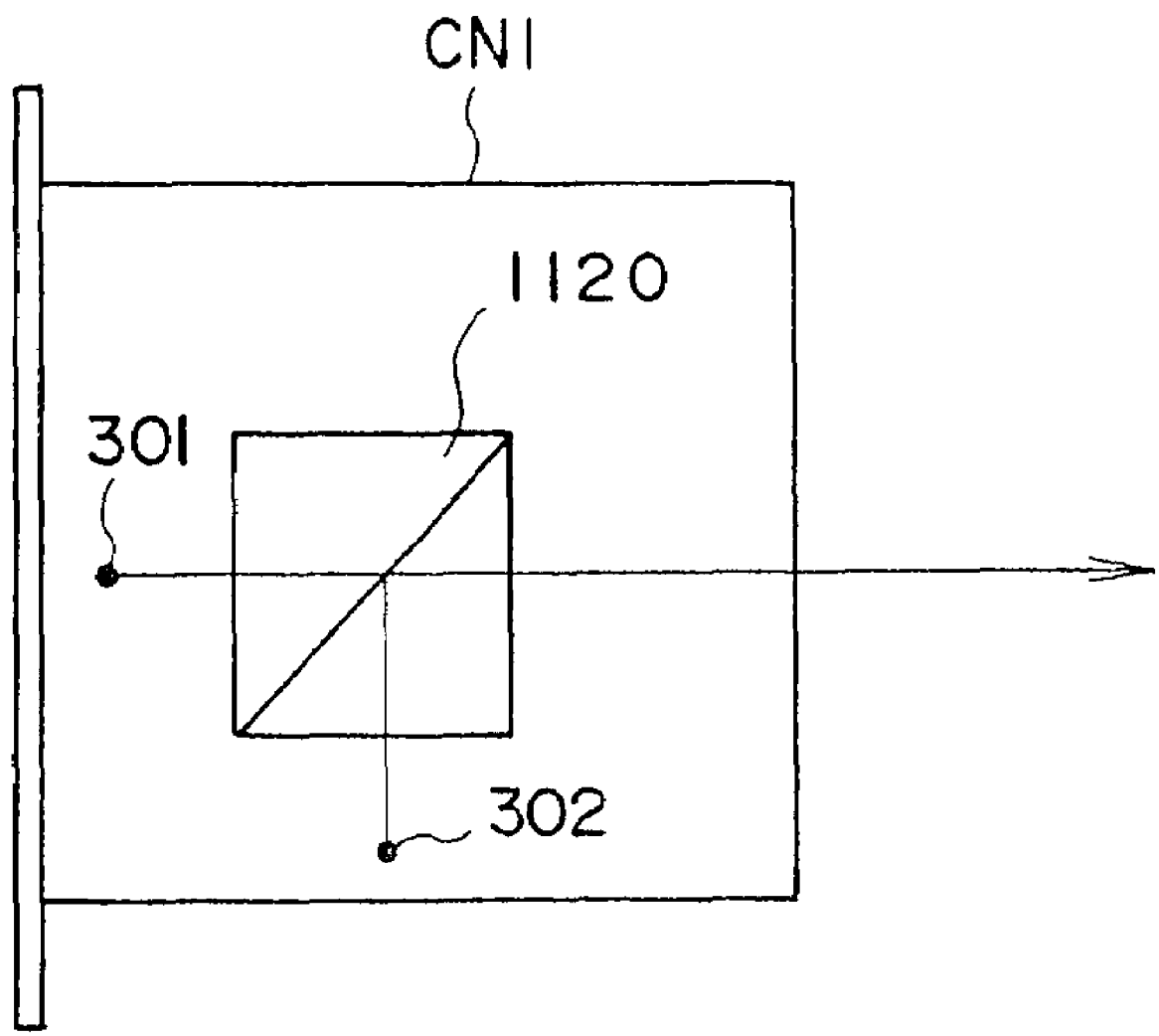

OPTICAL DISK APPARATUS COMPATIBLE WITH DIFFERENT TYPES OF MEDIUMS ADAPTED FOR DIFFERENT WAVELENGTHS

CROSS REFERENCE TO RELATED APPLICATIONS

This application is a continuation of application Ser. No. 11/447,078, filed on Jun. 6, 2006 which is a divisional of application Ser. No. 10/284,385, filed on Oct. 31, 2002, now U.S. Pat. No. 7,088,645, which is a continuation of application Ser. No. 09/760,743 filed on Jan. 17, 2001, now abandoned, which is a divisional of application Ser. No. 09/112,346, filed on Jul. 9, 1998, now U.S. Pat. No. 6,195,315, which claims priority to Japanese Patent Application Nos. 09-206656, filed Jul. 31, 1997, 09-190948, filed Jul. 16, 1997, and 09-201055, filed Jul. 11, 1997, the disclosures of which are hereby incorporated by reference in their entireties.

BACKGROUND OF THE INVENTION

1. Field of the Invention

The present invention generally relates to an optical disk apparatus compatible with recording mediums (hereinafter, referred to as optical disks) of different base thickness and to an optical disk apparatus in which a laser beam is effectively used and the size of the apparatus is reduced.

3. Description of the Related Art

FIG. 1 is a schematic diagram showing the construction of an optical disk apparatus according to the related art. Referring to FIG. 1, a linearly-polarized laser beam emitted by a semiconductor laser 101 is transformed into a parallel beam by a collimating lens 102. The collimated light beam is caused to pass through a polarizing beam splitter 103 and transformed into a circularly-polarized beam by passing through a λ/4 plate 104. The laser beam is then deflected by a deflecting prism 105 so as to be incident on an object lens 106. The objective lens 106 converges the light beam so that a laser spot of a small diameter is formed on an optical disk 107.

The laser beam reflected by the optical disk 107 is transformed into a circularly-polarized beam polarized in a direction opposite to the beam on an upstream path incident on the optical disk 107. The reflected light beam is transformed into a parallel light beam by the objective lens 106. The parallel beam is then deflected by the deflecting prism 105 and passes through the λ/4 plate 104. By passing through the λ/4 plate 104, the laser beam is transformed into a linearly-polarized beam polarized in a direction perpendicular to the polarizing direction of the laser beam on the upstream path. The linearly-polarized beam is incident on and reflected by the polarizing beam splitter 103. The reflected light beam is converged by a converging lens 108. The converged beam is incident on a photosensitive element 109. An data signal and a servo signal are retrieved based on a signal from the photosensitive element 109.

The background of the present invention is that there is a great demand for large-capacity optical recording. In order to meet such a demand, efforts are being made to reduce the wavelength of the laser beam.

Generally, the diameter of the laser beam spot formed on the optical disk 107 is proportional to the wavelength of the laser beam. The recording capacity increases in proportion to the square of the wavelength. Accordingly, the recording capacity is increased by reducing the wavelength of the laser beam.

However, it is to be noted that the reflectivity of the optical disk 107 and the required write power for the optical disk 107 may depend largely on the wavelength. When a laser beam of a short wavelength is used in the optical disk 107 characterized by a large degree of dependency, reading and writing may be disabled. That is, the optical disk apparatus may fail to be compatible with optical disks of different types.

One approach to overcome this problem is to use two laser beams, one having a conventional wavelength (for example, 785 nm) and the other having a wavelength (for example, 650 nm) smaller than the conventional wavelength. A simple way of implementing this approach is to provide two optical pickups by using two laser sources emitting two laser beams having different wavelength and two objective lenses having respective optical characteristics adapted for the different wavelength.

However, the use of two optical pickups increases the size and cost of the apparatus. Japanese Laid-Open Patent Application No. 6-259804 avoids this drawback by constructing an optical disk apparatus using a single optical pickup having two laser beam sources and one objective lens.

In a construction where two laser beam sources and one objective lens are provided, the quantity of light of the laser beam emitted by the laser source is detected by an actinometer using a split laser beam. However, it is difficult to split the laser beams from the two laser sources so that the two laser beams have an equal quantity of light or to split the laser beams with predetermined ratios of quantity of light assigned to the respective beams. For this reason, gain control should be performed when the signal from the actinometer is processed. There is a problem in that provision of a gain control circuit increases the cost of the apparatus.

Further, since it is difficult to control the quantity of light of the split beams properly, there is a problem in that it is difficult to ensure that the laser beam having an appropriate quantity of light is incident on the actinometer so that the laser beams are effectively used.

An additional problem is that, when the upstream optical path is split from the downstream optical path, the upstream optical path is perpendicular to the downstream optical path, thus making it difficult to reduce the size of the apparatus.

A description will now be given of another aspect of the related art to which the present invention is applied.

Recently, there is a growing demand for large storage capacity in an optical recording medium such as an optical disk. In order to increase the storage capacity without increasing the medium itself, the diameter of a light beam spot for writing and reading of information should be increased. Since the diameter of a light beam spot is proportional to a square of a wavelength λ, the storage capacity is inversely proportional to the wavelength λ. For this reason, reduction of the wavelength of a laser beam used in an optical pickup apparatus is sought. While a wavelength of 785 nm is used for writing and reading of information in a conventional CD-R optical disk, a reduced wavelength of 650 nm is used for a DVD optical disk now available.

Japanese Laid-Open Patent Application No. 6-259804 discloses an optical pickup apparatus in which two types of semiconductor lasers (referred to as light sources (LD) in the specification) emitting laser beams of difference wavelength so that the apparatus can be used for optical recording mediums characterized by different operating wavelength for writing and reading of information.

As is well known, a light beam emitted by a light source LD is divergent, the angle of divergence being maximum in a direction perpendicular to an active layer and minimum in a direction parallel with the active layer so that a far field pattern is elliptical in its configuration.

It is preferable that a light beam spot formed on an optical recording medium is circular. As the light beam spot approaches an elliptical configuration, the writing and reading performance becomes unfavorable.

In order to obtain a circular light beam spot, a portion of a light beam from the light source LD at the extremes of the major axis of a far field pattern may be blocked before the light beam is incident on a coupling lens for coupling. In this way, a circular beam section is obtained. However, according to such a method, not a small portion of the light beam from the light source is blocked, resulting in an poor efficiency in using optical energy for writing and reading. Since the optical energy required in an optical pickup apparatus for writing on an optical recording medium is more than ten times the energy required for reading, it is preferable for a maximum portion of the light beam from the light source to be exploited to form a light beam spot for proper information writing.

Merely exploiting the edge portions along the major axis of the far field pattern results in an elliptical configuration of a light beam spot (the minor axis of the far field pattern corresponds to the major axis of the light beam spot). In addition to exploit the edge portions along the major axis of the light beam spot, a beam shaping action is performed so that the section of the light beam approaches a circular configuration.

Beam shaping is implemented by a combination of two prisms or a cylindrical lens. However, using prisms or a cylindrical lens may increase the size of the apparatus.

SUMMARY OF THE INVENTION

Accordingly, a general object of the present invention is to provide an optical disk apparatus in which the aforementioned problems are eliminated.

Another and more specific object of the present invention is provide an object of the present invention is to provide an optical disk apparatus in which the compatibility with the existing optical disks is maintained, the laser beam is effectively used, the construction of the apparatus is simplified, the size of the apparatus is reduced, and the cost of the apparatus is reduced.

Still another object of the present invention is to provide a compact optical pickup apparatus which can be used for two types of optical recording mediums characterized by difference operating wavelength for writing and reading and in which the efficiency in using light beams is improved and a beam is properly shaped.

The aforementioned objects can be achieved by an optical disk apparatus comprising: two information recording mediums having different base thickness; two laser beam sources emitting respective laser beams of different wavelength commensurate with respective base thickness; an objective lens for converging the laser beams from the two laser beam sources so as to form respective beam spots on the two information recording mediums; polarizing optical path separating means which, provided between the two laser beam sources and the objective lens, separates an optical path for an upstream laser beam from an optical for a downstream laser beam depending on polarization of laser beams incident on the polarizing optical path separating means; a first phase plate which, provided between the two laser beam sources and the polarizing optical path separating means, provides a predetermined phase difference to laser beams incident from the two laser beam sources incident on the polarizing optical path separating means; and photosensitive means for receiving the downstream laser beam exiting the polarizing optical path separating means.

The aforementioned objects can also be achieved by an optical pickup apparatus compatible with a first optical recording medium adapted for a first wavelength for writing and reading and a second optical recording medium adapted for a second wavelength for writing and reading, comprising: a first light source emitting a first beam at the first wavelength; a second light source emitting a second beam at the second wavelength; a coupling lens for coupling one of the first beam and the second beam; an objective lens for converging the coupled beam so as to form a beam spot on a recording surface of one of the first optical recording medium and the second optical recording medium; optical path separating means for separating a return beam reflected by the optical recording medium and transmitted through the objective lens, from an upstream optical path leading from the light source to the objective lens, the optical path separating means being provided in alignment with both an upstream beam traveling to the recording surface and the return beam; detecting means for receiving the return beam separated by the optical path separating means so as to retrieve information from the return beam, the detecting means being provided in alignment with both the upstream beam and the return beam and including photosensitive means; control means for effecting focusing control and tracking control based on a result of detection by the detecting means, wherein the first light source is driven only when the first optical recording medium is used, the second light source is driven only when the second optical recording medium is used, the coupling lens is embodied by an anamorphic lens which provides different actions in a direction in which an angle of divergence of an incident beam is maximum and in a direction in which the angle of divergence is minimum, and which is provided with a collimating function for collimating one of the first beam and the second beam and a beam shaping function for shaping one of the first beam and the second beam.

The aforementioned objects can also be achieved by an optical pickup apparatus compatible with a first optical recording medium adapted for a first wavelength for writing and reading and a second optical recording medium adapted for a second wavelength for writing and reading, comprising: a first light source emitting a first beam at the first wavelength; a second light source emitting a second beam at the second wavelength; a coupling lens for coupling one of the first beam and the second beam; an objective lens for converging the coupled beam so as to form a beam spot on a recording surface of one of the first optical recording medium and the second optical recording medium; optical path separating means for separating an optical path of a return beam reflected by the optical recording medium and transmitted through the objective lens, from an upstream optical path leading from the light source to the objective lens, the optical path separating means being provided in alignment with both an upstream beam traveling to the recording surface and the return beam; detecting means for receiving the return beam separated by the optical path separating means so as to retrieve information from the return beam, the detecting means being provided in alignment with both the upstream beam and the return beam and including photosensitive means; control means for effecting focusing control and tracking control based on a result of detection by the detecting means, a beam shaping hologram element for transforming an elliptical intensity profile of the first beam and the second beam into a circular profile, wherein the first light source is driven only when the first optical recording medium is used, the second light source is driven only when the second optical recording medium is used.

BRIEF DESCRIPTION OF THE DRAWINGS

Other objects and further features of the present invention will be apparent from the following detailed description when read in conjunction with the accompanying drawings, in which:

FIG. 13 is a schematic diagram showing a construction of an optical disk apparatus according to a fourth embodiment of the present invention;

FIG. 14 is a schematic diagram showing a construction of an optical disk apparatus according to a variation of the fourth embodiment;

FIG. 26A shows an optical pickup apparatus according to a sixth embodiment of the present invention;

FIG. 26B shows a laser beam emitted by a light source;

FIG. 26C shows a beam shaping performance of a beam shaping hologram element;

FIG. 33 shows a construction of the optical axis aligning means according to a variation.

DETAILED DESCRIPTION OF THE PREFERRED EMBODIMENTS

Figure 1:
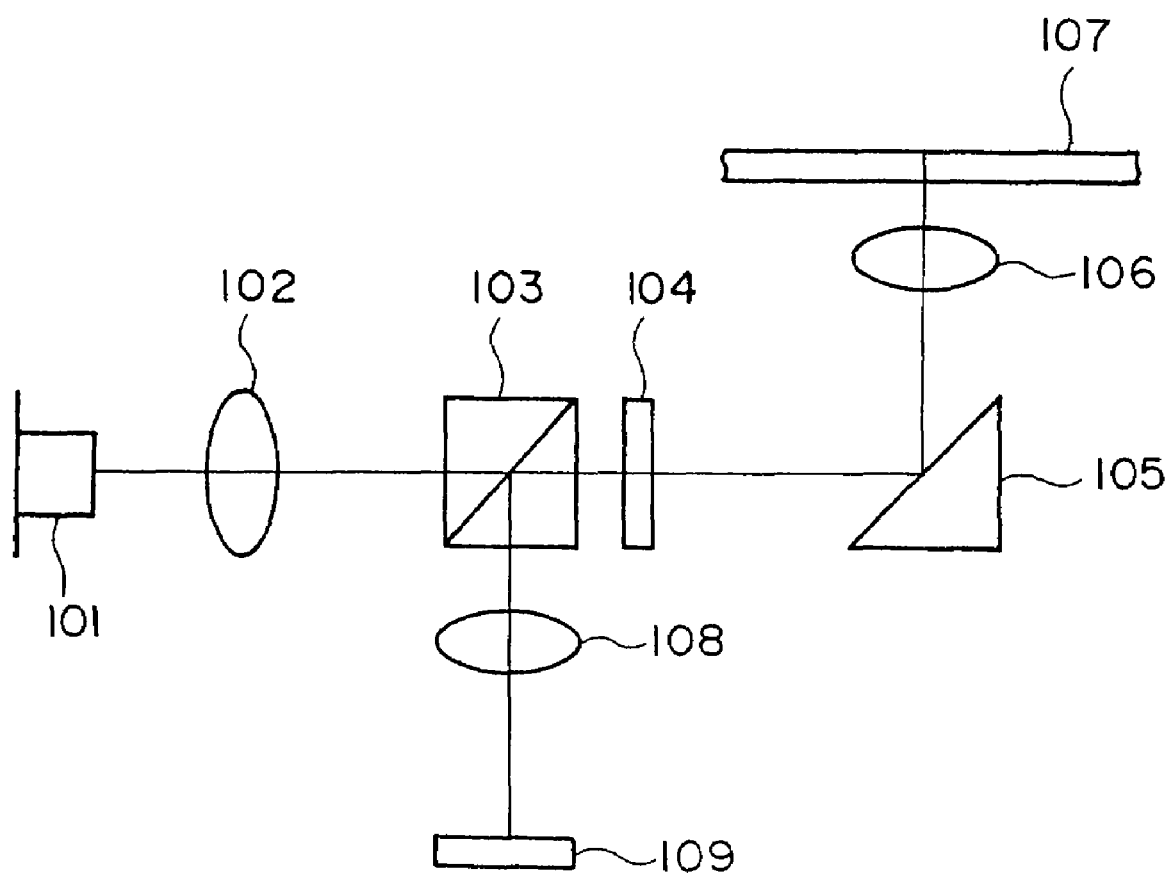
FIG. 1 is a schematic diagram showing the construction of an optical disk apparatus according to the related art.
Figure 2:
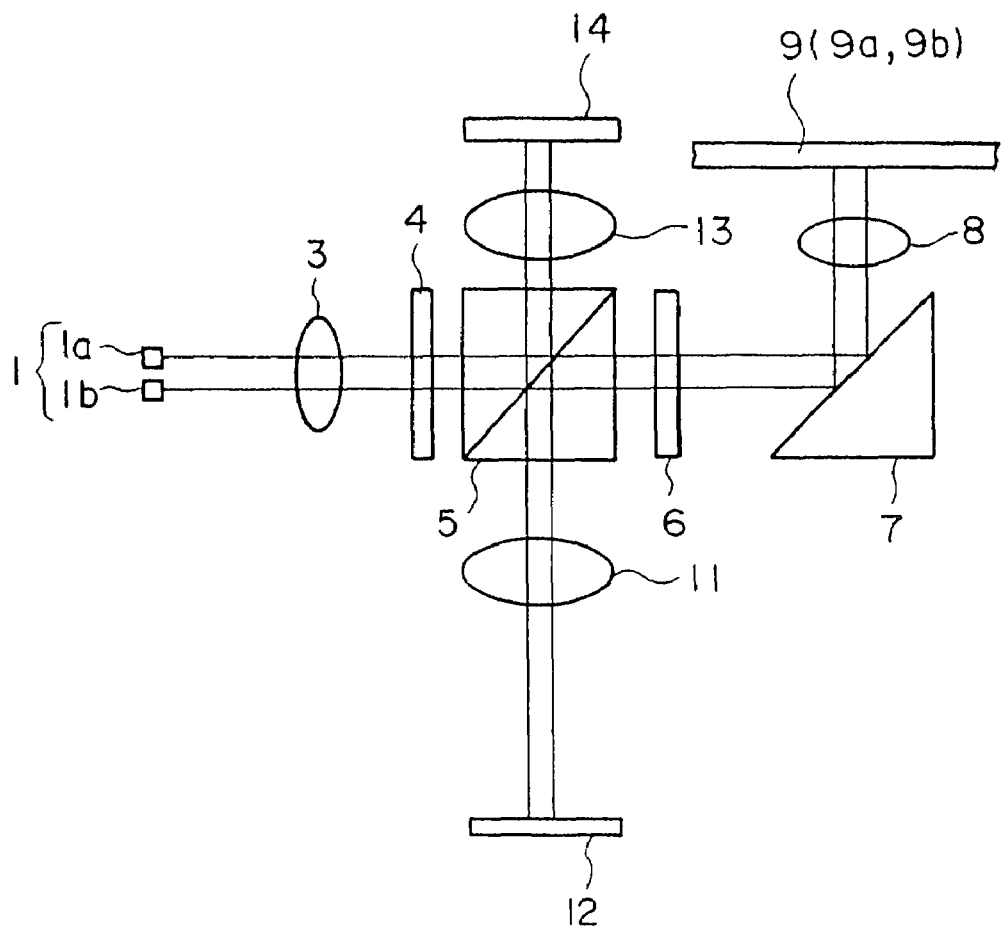
FIG. 2 is a schematic diagram showing the construction of an optical disk apparatus according to a first embodiment of the present invention.

FIG. 2 is a schematic diagram showing the construction of an optical disk apparatus according to a first embodiment of the present invention.

A first semiconductor laser 1a and a second semiconductor laser 1b emit respective laser beams having different wavelength. The laser beams emitted by the first and second semiconductor lasers 1a and 1b are transformed into substantially parallel beams by a collimating lens 3. The parallel laser beam is then incident on a phase plate 4 (first phase plate) that provides a phase shift to the laser beam. The laser beam exiting the phase plate 4 is incident on a polarizing beam splitter 5 (polarizing optical path separating means).

As shown in FIG. 2, the polarizing beam splitter 5 transmits substantially 100% of the P-polarized laser beam and reflects substantially 100% of the S-polarized laser beam. By using the polarizing beam splitter having such a characteristic with respect to a wide range of wavelength, the proper polarizing characteristic is obtained and a highly efficient optical system is produced for different wavelength.

When the laser beam exiting the phase plate 4 includes S-polarized components, the S-polarized components are reflected by the polarizing beam splitter 5 and converged by the converging lens 13. The converged laser beam is incident on the actinometer 14.

P-polarized components are transmitted by the polarizing beam splitter 5 and incident on a λ/4 plate 6 (second phase plate). The λ/4 plate 6 provides a λ/4 phase shift to the laser beam so that the laser beam is transformed into a circularly-polarized beam. The circularly-polarized beam is incident on a deflecting prism 7. The laser beam deflected by the deflecting prism 7 is converged by an objective lens 8 so that a small laser beam spot is formed on a first optical disk 9a or a second optical disk 9b.

The laser beam reflected by the first optical disk 9a or the second optical disk 9b travels on substantially the same path as the incident laser beam. The reflected laser beam is converged by the objective lens 8 and deflected by the deflecting prism 7 before being incident on the λ/4 plate 6. The λ/4 plate 6 transforms the laser beam into a S-polarized beam polarized in a direction perpendicular to the polarizing direction of the laser beam on the upstream path. The S-polarized laser beam is incident on and reflected 100% by the polarizing beam splitter 5.

The reflected laser beam is converged by a detecting lens 11 and incident on a photosensitive element 12. A data signal, a tracking signal and a servo signal for focusing are retrieved from a signal from the photosensitive element 12, using a known method.

The wavelength of the laser beam emitted by the first semiconductor laser 1a may be 785 nm and the wavelength of the laser beam emitted by the second semiconductor laser 1b may be 650 nm. In the following description, it is assumed that the first optical disk 9a is a low-capacity optical disk having a relatively large base thickness of 1.2 mm and the second optical disk 9b is a large-capacity optical disk having a relatively small base thickness of 0.6 mm.

When a writing operation or a reading operation is performed on the first optical disk 9a, the first semiconductor laser 1a is activated. When a writing operation or a reading operation is performed on the second optical disk 9b, the second semiconductor laser 1b is activated.

Of course, the values of the wavelength and the base thickness are given above as examples.

In the following description, the first semiconductor laser 1a may be referred to as a large-wavelength laser 1a and the second semiconductor laser 1b may be referred to as a small-wavelength laser 1b. The lasers 1a and 1b may be inclusively referred to as a laser 1. The optical disk 9a having a relatively large base thickness may be referred to as a low-density disk 9a. The optical disk 9b having a relatively small base thickness may be referred to as a high-density disk 9b. The optical disks 9a and 9b may be inclusively referred to as an optical disk 9.

A detection lens 11 may be implemented by a cylindrical lens having one surface thereof formed as a spherical surface. The astigmatism method may be employed to obtain a focus signal. The phase difference method may be employed to obtain a tracking signal.

Figure 3:
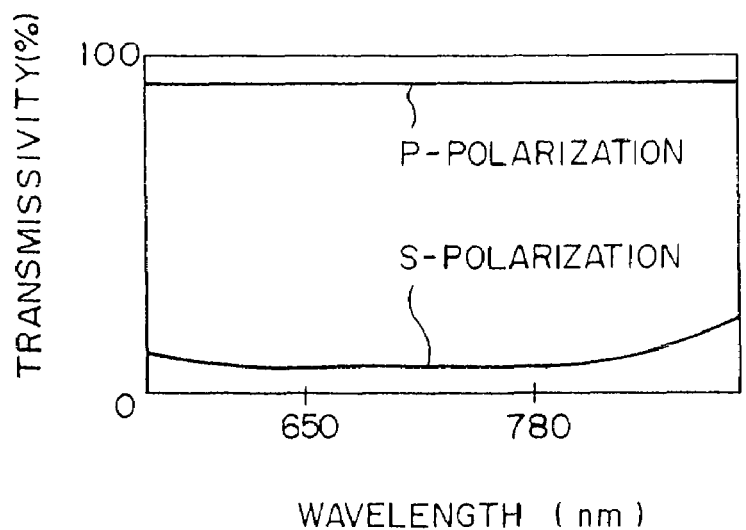
FIG. 3 shows a characteristic of a polarizing beam splitter.
Figure 4:
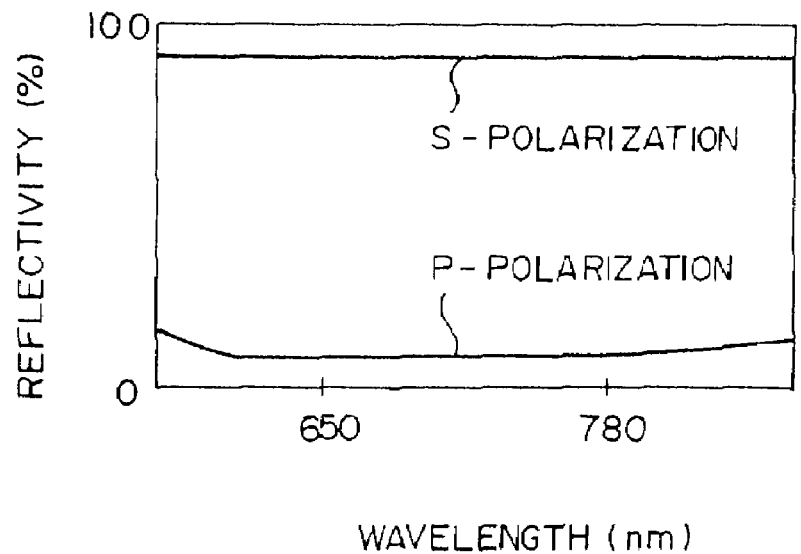
FIG. 4 shows a characteristic of a polarizing beam splitter opposite to the characteristic of FIG. 3.

As shown in FIG. 4, the polarizing beam splitter 5 may have an optical characteristic whereby P-polarized laser beams are transmitted 100% and S-polarized laser beams are reflected 100%. When the polarizing beam splitter 5 has such a characteristic, the phase plate 4 and the λ/4 plate 6 may be accordingly controlled to produce a phase difference adapted for the characteristic of the polarizing beam splitter 5. In the following description, it is assumed that the polarizing beam splitter 5 has the characteristic as shown in FIG. 3.

The phase plate 4 and the λ/4 plate 6 are assumed to have a single-plate construction. However, the phase plate 4 and the λ/4 plate 6 may be formed of two plates attached to each other such that the optical axes thereof are perpendicular to each other.

A description will now be given, with reference to FIG. 5, of the function of the phase plate 4. Generally, a semiconductor laser has a laser chip 1c as shown. A laser beam polarized in a direction parallel with an active layer 1d is emitted from the active layer 1d. Referring also to FIG. 2, it is assumed that the active layer 1d of the laser chip 1c of the laser 1 lies in a downward direction on the paper.

With this construction, the laser beam incident on the polarizing beam splitter 5 is P-polarized so that, when the laser beam is not guided into the actinometer 14, that is, when the laser beam from the laser 1 is incident on the polarizing beam splitter 5 and transmitted thereby, it is not necessary for the phase plate 4 to produce a phase difference.

When a portion of the laser beam incident on the polarizing beam splitter 5 is guided into the actinometer 14, that is, when approximately 10% of the laser beam arriving at the optical disk 9 is guided into the actinometer 14, a thickness D1 of the phase plate 4 may be set to meet the equations 1-3 to be described later.

When approximately 10% of the laser beam arriving at the optical disk 9 is caused to be incident on the actinometer 14, the optical axis of the phase plate 4 may be inclined at approximately 9° with respect to the plane of P-polarization. The S-polarized components resulting from a phase difference of λ/2 produced by the phase plate 4 may be incident on the polarizing beam splitter.

Assuming that the laser beams from the laser 1 have wavelength $\lambda 1$, $\lambda 2$, the phase plate 4 has refractive indices $no(\lambda 1)$, $no(\lambda 2)$ with respect to the ordinary rays having the wavelength $\lambda 1$, $\lambda 2$, the phase plate 4 has refractive indices $ne(\lambda 1)$, $ne(\lambda 2)$ with respect to extraordinary rays having the wavelength $\lambda 1$, $\lambda 2$, and the thickness of the phase plate is D1, phase differences $\delta(\lambda 1)$, $\delta(\lambda 2)$ caused by the laser beams having the wavelength $\lambda 1$, $\lambda 2$ passing through the phase plate 4 are such that $$\delta(\lambda 1)=(2\pi/\lambda 1)(no(\lambda 1)-ne(\lambda 1))D1 \quad (1)$$

$$\delta(\lambda 2)=(2\pi/\lambda 2)(no(\lambda 2)-ne(\lambda 2))D2 \quad (2)$$

In order to ensure that the same phase difference λ/2 is provided to the laser beams having the wavelength $\lambda 1$, $\lambda 2$, the phase difference $\delta(\lambda 1)$ and the phase difference $\delta(\lambda 2)$ may satisfy the following the relation.

$$\delta(\lambda 1)=(2n+1)\delta(\lambda 2)=(2N+1)\pi \quad (3),$$

where $n=0, 1, 2, 3 \ldots N=1, 2, 3 \ldots$

In case a large-wavelength laser 1a has a built-in back laser beam detector (not shown) detects the quantity of light emitted from the large-wavelength laser 1a and the actinometer 14 receives approximately 10% of the laser beam reaching the optical disk so as to detect the quantity of light emitted by the short-wavelength laser 1b, the thickness D1 of the phase plate 4 is determined as described below.

The thickness D1 must be controlled so that the laser beam from the large-wavelength laser 1a is not reflected by the polarizing beam splitter 5 but is transmitted therethrough. Therefore, it is not necessary for the phase plate 4 to provide a phase difference for the laser beam. In the event that a phase difference is produced, the phase difference may be an integral multiple of the wavelength $$\delta(\lambda 1) = 2n\pi \quad (4)$$

The optical axis of the phase plate 4 should be inclined at an angle of approximately 9° with respect to the plane of P-polarization so that the phase difference produced by the phase plate 4 is $\lambda/2$ with respect to the laser beam from the short-wavelength laser 1b.

$$\delta(\lambda 2) = (N+1)\pi \quad (5)$$

The thickness D1 of the phase: plate 4 may be set so that the phase differences $\delta(\lambda 1)$ and $\delta(\lambda 2)$ satisfy the equations (4) and (5).

In case a short-wavelength laser 1b has a built-in back laser beam detector (not shown) detects the quantity of light emitted from the short-wavelength laser 1b and the actinometer 14 receives approximately 10% of the laser beam reaching the optical disk so as to detect the quantity of light emitted by the long-wavelength laser 1a, the thickness D1 of the phase plate 4 is also determined as described above.

A description will now be given of an arrangement wherein the laser beam from the optical disk 8 is deflected by the deflecting prism 7 and incident on the polarizing beam splitter 5, substantially the entirety of the laser beam incident on the polarizing beam splitter 5 is reflected by the polarizing beam splitter 5 before being guided to the photosensitive element 12, that is, an arrangement wherein the polarizing beam splitter 5 is used to separate the upstream optical path from the downstream optical path.

The characteristic shown in FIG. 3 shows that, in this case, it is necessary for the laser beam on the downstream optical path to be S-polarized. Since the laser beam on the upstream optical path leaving the polarizing beam splitter 5 is P-polarized, it is required that a phase difference of $\lambda/4$ be produced by passing through the $\lambda/4$ plate on the upstream path and the downstream path. That is, a phase difference of $\lambda/4$ should be produced by passing through the $\lambda/4$ plate once.

The thickness D2 of the $\lambda/4$ plate 6 that satisfies such a condition is determined as follows. Given that the refractive indices provided by the $\lambda/4$ plate 6 to the ordinary rays having the wavelength $\lambda 1$ and $\lambda 2$ are indicated by No(1) and No(2), the refractive indices provided to the extraordinary rays are indicated by Ne(1) and Ne(2), phase differences $\delta(\lambda 1)$ and $\delta(\lambda 2)$ provided to the laser beams having the wavelength $\lambda 1$ and $\lambda 2$ are such that $$\delta(\lambda 1) = (2\pi/\lambda 1)(No(\lambda 1) - Ne(\lambda 1))D2 \quad (6)$$

$$\delta(\lambda 2) = (2\pi/\lambda 2)(No(\lambda 2) - Ne(\lambda 2))D2 \quad (7)$$

The thickness D2 of the $\lambda/4$ plate 6 may be determined so that the following relation is valid.

$$\delta(\lambda 1) = (2n+1)\delta(\lambda 2) = (2N+1)(\pi/2) \quad (8)$$

where n=0, 1, 2, 3 . . . , N=1, 2, 3 . . .

As has been described above, by setting the thickness of the $\lambda/4$ plate 6 so as to meet the purpose, a desired phase difference is provided to the laser beams of difference wavelength. With this, the laser beam of a desired quantity of light can be retrieved by separation at the polarizing beam splitter 5.

Since the quantity of split laser beam received by the actinometer 14 has a desired level, there is no need to perform gain control. Accordingly, the necessity for a gain controlling circuit is eliminated. Since the split laser beam has a sufficient quantity of light, the laser beam can be effectively used and the flexibility in designing the optical system is facilitated.

By providing a $\lambda/4$ plate producing a $\lambda/4$ phase difference to the beams having different wavelength, it is ensured that, for different wavelength, the polarization of the upstream laser beams is perpendicular to that of the downstream laser beams. Thus, the polarizing beam splitter 5 can perform efficient separation of the upstream optical path from the downstream optical path so that the efficiency in using the laser beam is improved.

The phase plate 4 and the $\lambda/4$ plate 6 may be integral with the polarizing beam splitter 5. In such a case, the number of parts can be reduced so that the size and cost of the apparatus are reduced.

The phase plate 4 and the $\lambda/4$ plate 6 may be formed as a vapor-deposited film providing a phase difference and having an appropriate thickness. According to this approach, there is no need to use a high-cost birefringent crystal to implement these parts, thus contributing greatly to reduction in size and cost of the apparatus.

The vapor-deposited film may be formed of $Ta_2O_5$, $SnO_2$ or the like.

A description will be given of the appropriate thickness mentioned above. For example, the wavelength may be such that $\lambda=650$ nm and the phase plate 4 is to have a thickness of $\lambda/4$, that is, 162.5 nm. It is very difficult to form such a thin plate using the slicing technology and to assemble such a plate into the apparatus. For this reason, conventionally, the phase plate is formed to have a thickness of $\lambda/4+k\lambda$ (where k indicates an integral). The same phase difference is produced as when the plate has a thickness of $\lambda/4$. Since the cutting and assembling processes are not necessary, the vapor-deposited phase film may have a thickness as small as 162.5 nm=$\lambda/4$.

Figure 6:
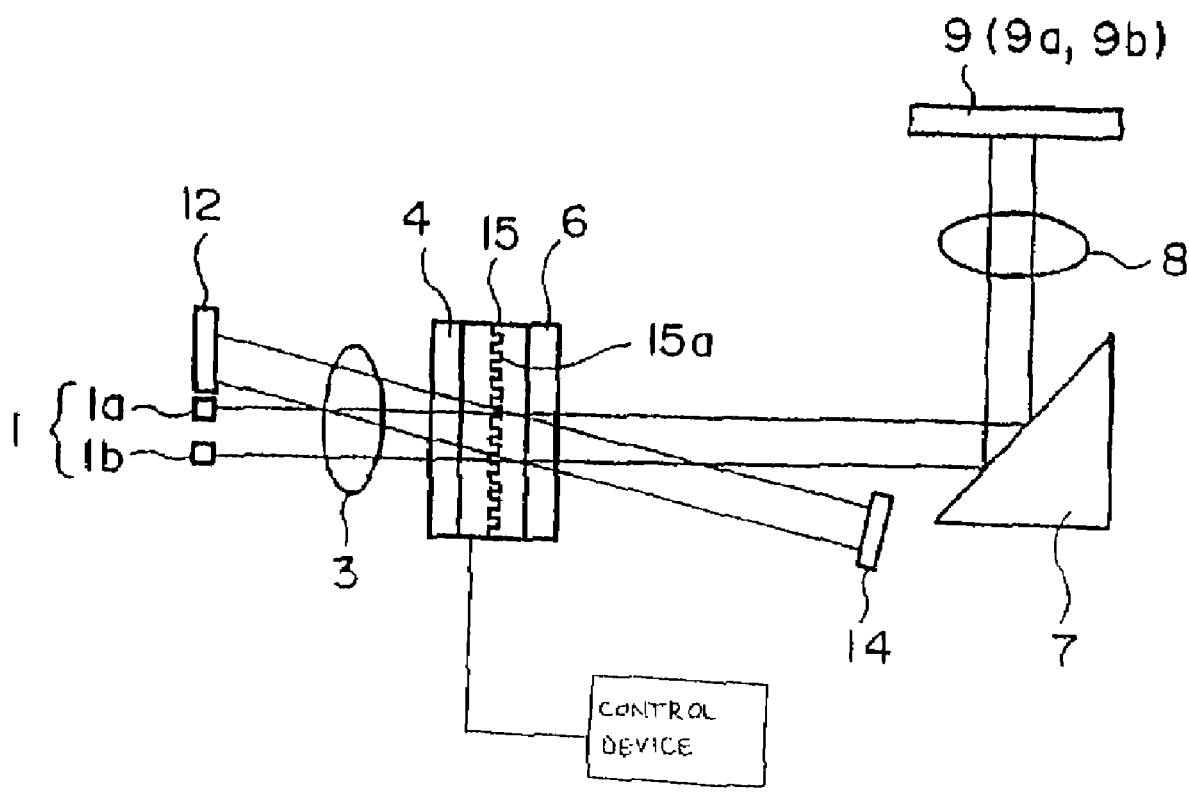
FIG. 6 is a schematic diagram showing a construction of an optical disk apparatus according to a second embodiment of the present invention.

FIG. 6 is a schematic diagram showing the construction of an optical disk apparatus according to a second embodiment of the present invention. In the second embodiment, a polarizing diffraction grating 15 is used in place of the polarizing beam splitter 5 of FIG. 2. The phase plate 4 and the $\lambda/4$ plate 6 are formed to be integral with the polarizing diffraction grating 15. Of course, the phase plate 4 and the $\lambda/4$ plate 6 may not be formed to be integral with the polarizing diffraction grating 15. However, the integral construction provides the aforementioned advantages.

The polarizing diffraction grating 15 is provided with grating slits 15a. Depending on the state of polarization of the laser beam incident on the polarizing diffraction grating 15, the laser beam may be transmitted or diffracted.

The polarizing diffraction grating 15 may be a $LiNbO_3$ polarizing hologram in which grating slits are formed. The grating slits may be formed as having a small pitch (for example, ½ of the wavelength) and a relatively large depth (Hideo Maeda "High-density dual grating for magneto-optic head", Optics Vol. 20, No. 8, pp. 36, August 1991). In the description of the second embodiment, it is assumed that the polarizing diffraction grating 15 is implemented by a $LiNbO_3$ provided with grating slits.

Polarized components of the laser beam from the laser 1 travels in a direction parallel with the grating slits 15a of the polarizing diffraction grating 15 (that is, in a rightward direction in FIG. 6). Polarized components produced by the phase plate 4 and polarized in a direction perpendicular to the grating slits 15a (that is, polarized in a vertical direction on the plane of paper) are incident on the actinometer 14 after diffraction.

Polarized components polarized in a direction parallel with the grating slits 15a (that is, in a direction perpendicular to the plane of paper) are transmitted through the polarizing diffraction grating 15 and transformed into circularly-polarized beam for irradiating the optical disk 9.

The laser beam reflected by the low-density disk 9a is transmitted by the λ/4 plate 6 into a beam polarized in a direction perpendicular to the grating slits 15a so that the beam is diffracted by the polarizing diffraction grating 15. The diffracted beam is converged by a collimating lens 3 and received by the photosensitive element 12 so that a data signal and a servo signal are retrieved.

Figure 7:
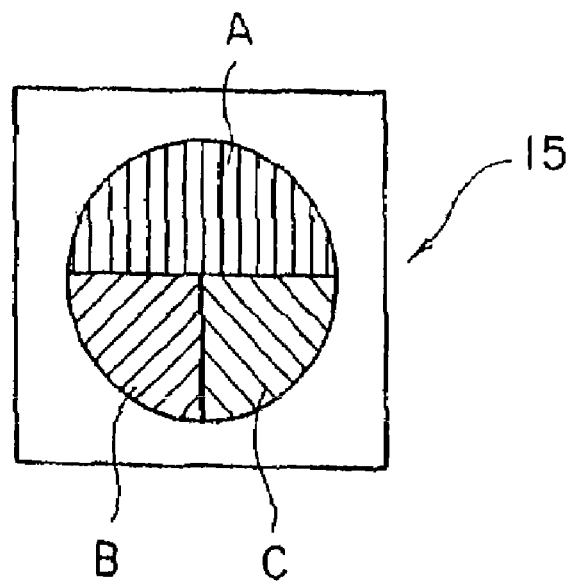
FIG. 7 shows a construction of a polarizing diffraction grating used in the optical disk apparatus of FIG. 6.
Figure 8:
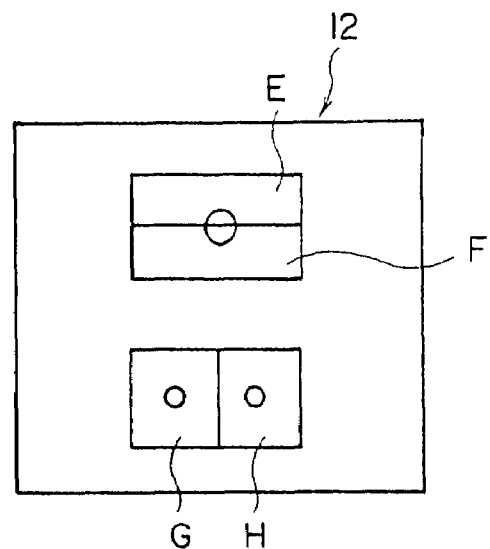
FIG. 8 shows a construction of a photosensitive element used in the optical disk apparatus of FIG. 6.

The polarizing diffraction grating 15 may be formed as a segmented element as shown in FIG. 7. The photosensitive element 12 may be formed as a segmented element as shown in FIG. 8. FIGS. 7 and 8 are provided only for an illustrative purpose and the present invention is not limited to the arrangement as shown.

The polarizing diffraction grating 15 shown in FIG. 7 includes three segments A, B and C. The laser beam is diffracted in a direction defined by the grating slits 15a formed in each of the segments A, B and C. The photosensitive element 12 may include four segments E, F, G and H, as shown in FIG. 8.

The laser beam diffracted in the segment A of FIG. 7 is controlled to be incident on an area between the segment E and the segment F of the photosensitive element 12. The knife edge method is employed to retrieve the focus signal Fc from a difference between photoelectric signals from the segment E and from the segment F.

The laser beam diffracted in the segments B and C are incident on the segments G and H of the photosensitive element 12. A track signal Tr is retrieved from a difference between photoelectric signals from the segment G and from the segment H.

The data signal is retrieved from a sum (or a portion of a sum) of the photoelectric signals from the segments E, F, G and H.

Thus, since the upstream optical path and the downstream optical are not perpendicular to each other after the optical path separation by the polarizing diffraction grating 15, the size of the apparatus is reduced.

By segmenting the polarizing diffraction grating for servo signal detection, optical elements conventionally required for servo signal generation such as a cylindrical lens and a knife edge prism are no longer necessary. Thus, the cost of the apparatus and the number of parts constituting the same are reduced.

A description will now be given of an optical disk apparatus according to a third embodiment of the present invention. Those components that are identical to the corresponding components in the first and second embodiments are designated by the same reference numerals and the description thereof is omitted.

In the first and second embodiments, the photosensitive means as claimed is implemented by a single photosensitive element 12 so that the laser beam reflected by the low-density disk 9a and the high-density 9b is received by the photosensitive element 12.

In an alternative arrangement, two photosensitive elements 17 and 18 may be employed instead of the photosensitive element 12. The photosensitive element 17 is exclusively used to detect the servo signal for the low-density disk 9a and the photosensitive element 18 is exclusively used to detect the servo signal for the high-density disk 9b. With this, the photosensitive elements 17 and 18 are easily controlled and high-quality signals are obtained.

Figure 9:
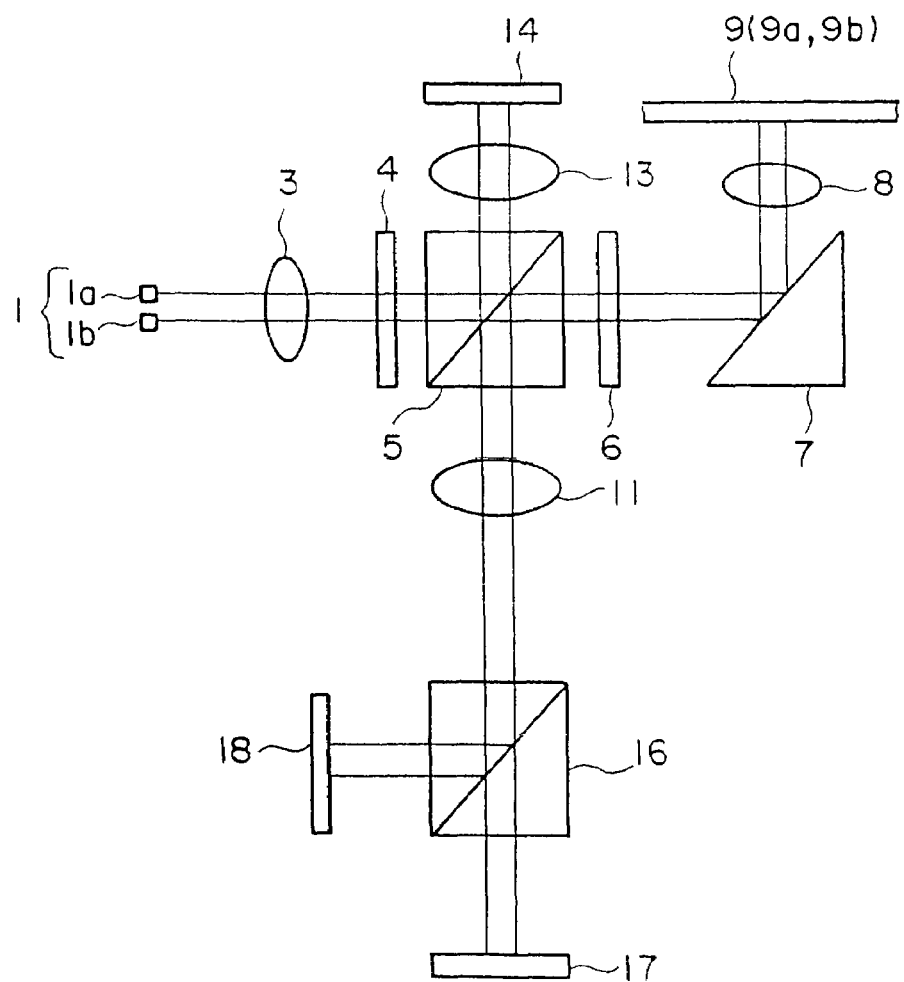
FIG. 9 is a schematic diagram showing a construction of an optical disk apparatus according to a third embodiment of the present invention.
Figure 10:
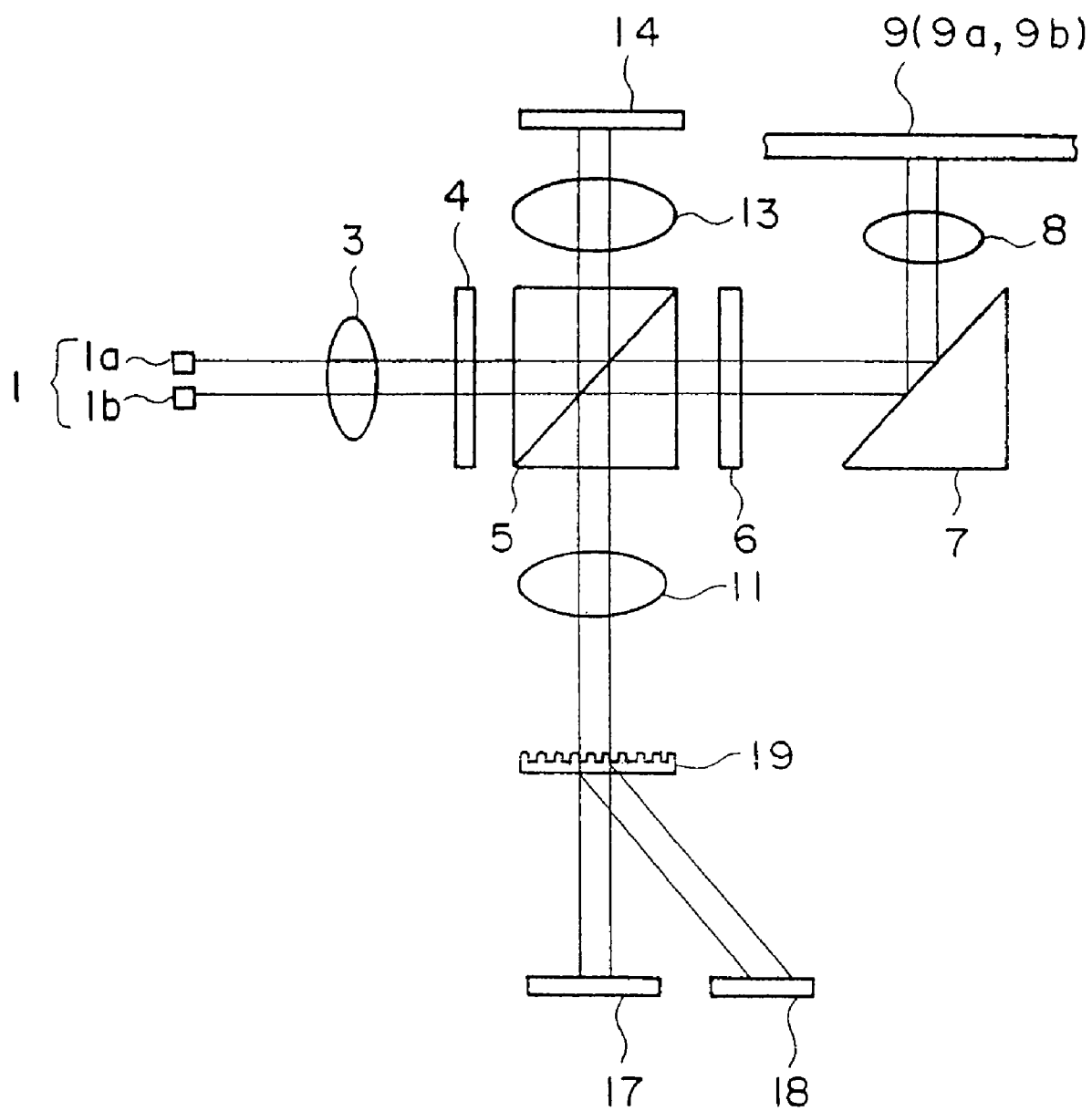
FIG. 10 is a schematic diagram showing a construction of an optical disk apparatus according to a first variation of the third embodiment.
Figure 11:
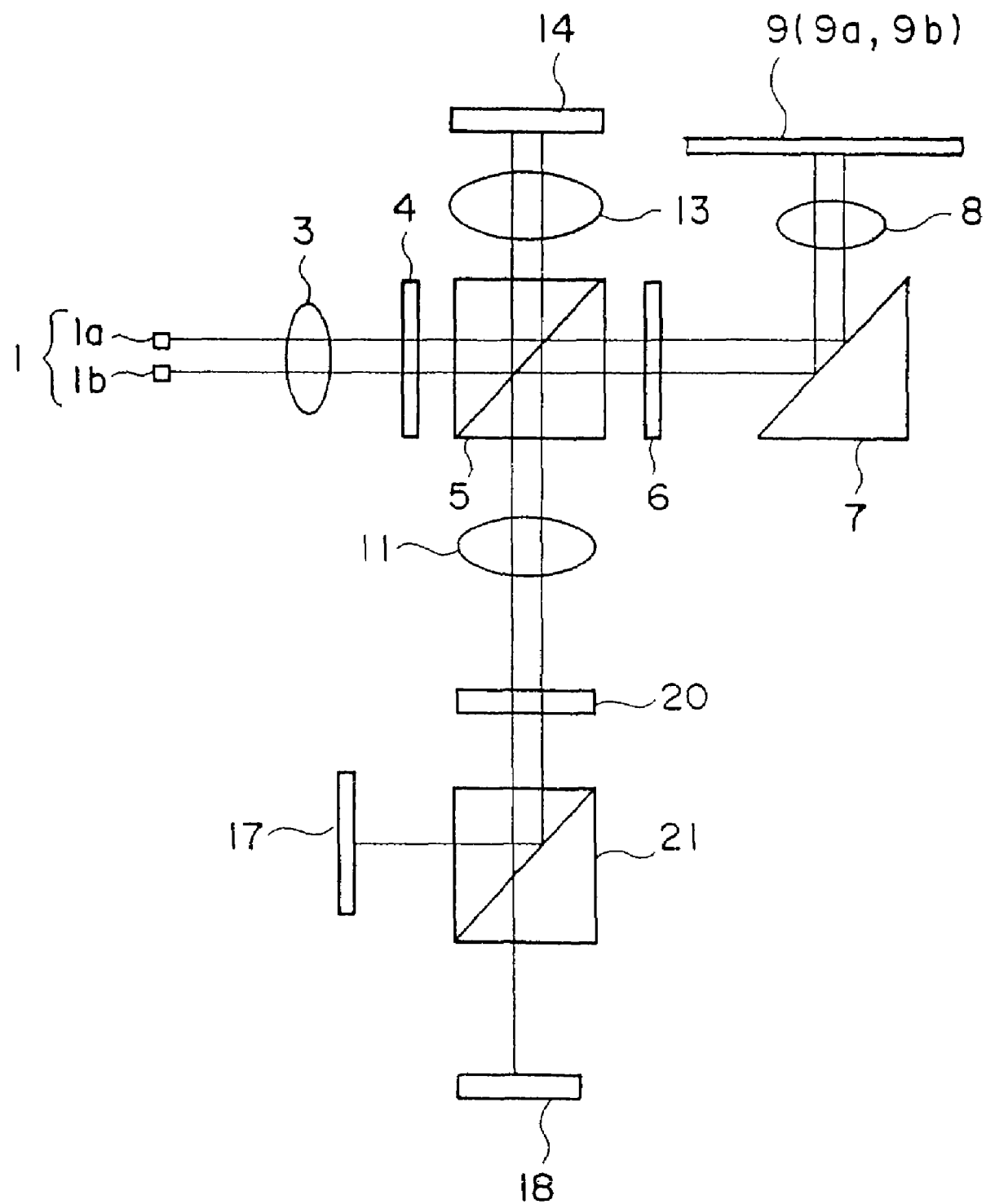
FIG. 11 is a schematic diagram showing a construction of an optical apparatus according to a second variation of the third embodiment.

While FIGS. 9-11 show examples of the above arrangement applied to the first embodiment, the construction with two photosensitive elements may also be applied to the second embodiment.

Laser beam splitters 16 and 19 shown in FIGS. 9 and 10, respectively, split the incident laser beams irrespective of the wavelength. That is, the laser beam splitters 16 and 19 split the laser beams reflected by the low-density disk 9a and by the high-density disk 9b so as to allow the split beams to be incident on the photosensitive element 17 and the photosensitive element 18. Laser beam splitters 21 and 22 shown in FIGS. 11 and 12, respectively, change the optical path of the incident laser beam and cause the exiting laser beam to enter the photosensitive element 17 or the photosensitive element 18 depending on whether the incident laser beam is reflected by the low-density disk 9a or by the high-density disk 9b.

Referring to FIG. 9, a half mirror 16 (laser beam splitting means) is provided in an optical path between the detecting lens 11 and the photosensitive elements 17 and 18 so that the laser beam from the detecting lens 11 is split into two beams by the half mirror 16, one of the beams entering the photosensitive element 17 and the other entering the photosensitive element 18.

When the laser beam from the large-wavelength laser 1a is used to write to and read from the low-density disk 9a, the photoelectric signal from the photosensitive element 17 is used to retrieve the servo signal and the data signal. When the laser beam from the small-wavelength laser 1b is used to write to and read from the high-density disk 9b, the photoelectric signal from the photosensitive element 18 is used retrieve the servo signal and the data signal.

Referring to FIG. 10, a diffraction grating 19 (laser beam splitting means) is provided in an optical between the detecting lens 11 and the photosensitive elements 17 and 18 so that the laser beam from the detecting lens is split into two beams, one of the beams entering the photosensitive element 17 and the other entering the photosensitive element 18.

When the laser beam from the large-wavelength laser 1a is used to write to and read from the low-density disk 9a, the photoelectric signal from the photosensitive element 17 is used to retrieve the servo signal and the data signal. When the laser beam from the small-wavelength laser 1b is used to write to and read from the high-density disk 9b, the photoelectric signal from the photosensitive element 18 is used retrieve the servo signal and the data signal.

Referring to FIG. 11, a phase plate 20 (third phase plate) and the laser beam splitter 21 such as a polarizing beam splitter (laser beam splitting means) is provided in an optical path between the detecting lens 11 and the photosensitive elements 17 and 18.

The phase plate 20 produces a phase difference which is an integral multiple of the wavelength in the laser beam from the large-wavelength laser 1a, and produces a phase difference of approximately λ/2 in the laser beam from the small-wavelength laser 1b. The laser beam exiting the phase plate 20 is then incident on the laser beam splitter 21 for optical path separation.

The laser beam from the large-wavelength laser 1a reflected by the low-density disk 9a is transmitted by the phase plate 20 into an S-polarized beam and incident on the laser beam splitter 21 so as to be reflected substantially 100% by the laser beam splitter 21 before entering the photosensitive element 17. The laser beam from the small-wavelength laser 1b is transformed by the phase plate 20 into a P-polarized beam and incident on the laser beam splitter 21 so as to be transmitted substantially 100% through the laser beam splitter 21 before entering the photosensitive element 18.

When the laser beam from the larger-wavelength laser 1a is used to write to and read from the low-density disk 9a, the servo signal and the data signal are retrieved based on the output from the photosensitive element 17. When the laser from the small-length laser 1b is used to write to and read from the high-density disk 9b, the servo signal and the data signal are retrieved based on the output from the photosensitive element 18.

Figure 12:
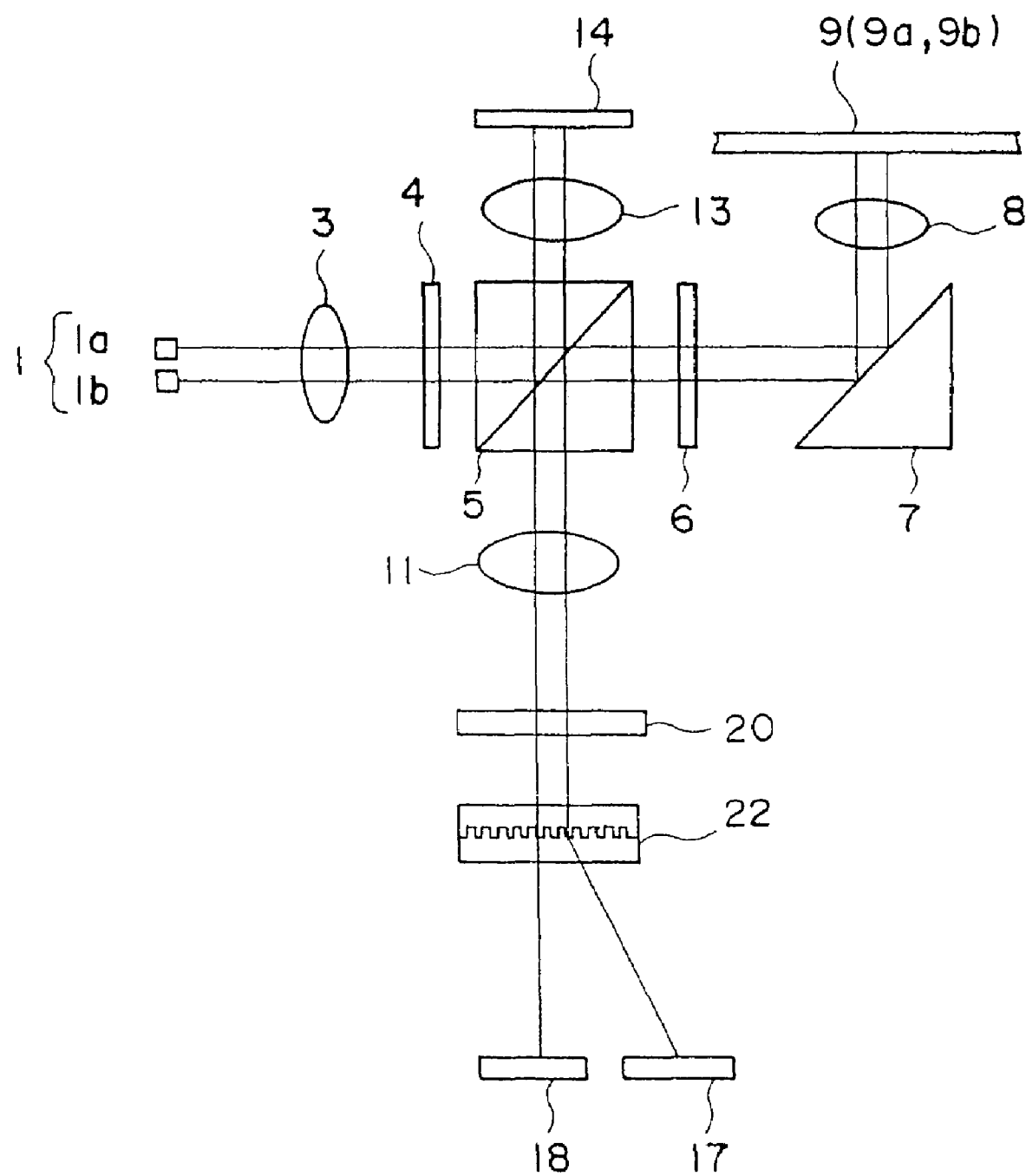
FIG. 12 is a schematic diagram showing a construction of an optical apparatus according to a third variation of the third embodiment.

Referring to FIG. 12, the phase plate 20 (third phase element) and the polarizing diffraction grating 22 are provided in an optical path between the detecting lens 11 and the photosensitive elements 17 and 18. The phase plate 20 produces a phase difference which is an integral multiple of the wavelength in the laser beam from the large-wavelength laser 1a, and produces a phase difference of approximately $\lambda/2$ in the laser beam from the small-wavelength laser 1b. The laser beam exiting the phase plate 20 is then incident on the polarizing diffraction grating 22 and then on the photosensitive element 17 or the photosensitive element 18. The polarizing diffraction grating 22 may have the same construction as the polarizing diffraction grating 15.

The phase plate 20 causes the laser beam from the large-wavelength laser 1a to be polarized in a direction perpendicular to grating slits 22a of the polarizing diffraction grating 22 (that is, polarized in a horizontal direction on the plane of paper). The laser beam thus polarized is diffracted by the polarizing diffraction grating 22 so as to be incident on the photosensitive element 17.

The phase plate 20 causes the laser beam from the small-wavelength laser 1b to change its direction of polarization by 90 degrees so as to be polarized in a direction parallel with the grating slits 22a of the polarizing diffraction grating 22 (that is, polarized in a direction perpendicular to the plane of paper). The laser beam thus polarized is transmitted through the polarizing diffraction grating 22 so as to be incident on the photosensitive element 18.

When the laser beam from the large-wavelength laser 1a is used to write to and read from the low-density disk 9a, the photoelectric signal from the photosensitive element 17 is used to retrieve the servo signal and the data signal. When the laser beam from the small-wavelength laser 1b is used to write to and read from the high-density disk 9b, the photoelectric signal from the photosensitive element 18 is used retrieve the servo signal and the data signal.

By using the diffraction grating 19 and the polarizing diffraction grating 22 as laser beam splitting means, the angle between split laser beams is controlled to be small so that the size of the apparatus is reduced.

By using the phase plate 20 so as to ensure that the two beams incident on the polarizing beam splitter 21 or the polarizing diffraction grating 22 are polarized in respective directions perpendicular to each other, it is ensured that the laser beams having different wavelength are completely separated from each other so as to be received by the respective photosensitive elements 17 and 18. Therefore, the efficiency in using the laser beam is improved and the data signal and the servo signal having a high S/N ratio are retrieved.

A description will now be given of an optical disk apparatus according to a fourth embodiment of the present invention. Those components that are identical to the corresponding components of the first through third embodiments are designated by the same reference numerals and the description thereof is omitted.

In the above description, it is assumed that the large-wavelength laser 1a and the short-wavelength laser 1b are formed to be independent of each other. However, as shown in FIGS. 13 and 14, a laser unit having two lasers accommodated in a case may also be used.

FIGS. 13 and 14 show how such a laser unit is applied to the second embodiment. Of course, such a laser unit may also be applied to the first embodiment.

Figure 5:
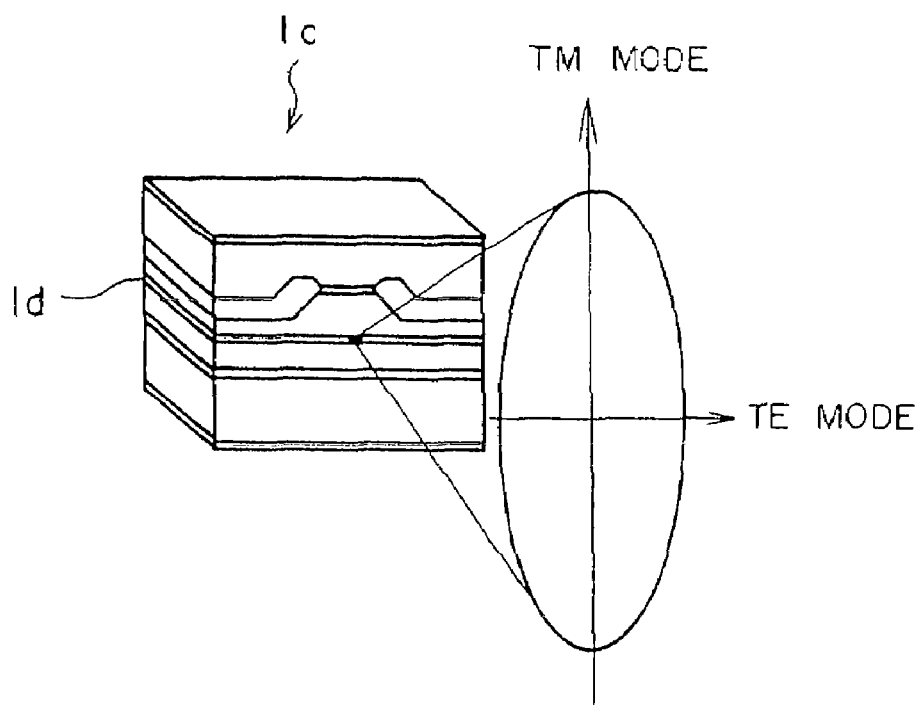
FIG. 5 is a perspective view of a laser chip.

As shown in FIG. 13, the laser unit is provided with two laser chips 23a and 23b as shown in FIG. 5 and the photosensitive element 12. The laser chips 23a and 23b emits laser beams having the same wavelength as that of the laser 1. That is, the laser chip 23a emits a laser beam having a wavelength of 635 nm and the laser chip 23b emits a laser beam having a wavelength of 785 nm.

The direction of polarization of the laser beam at the wavelength of 635 nm is controlled to be perpendicular to an active layer of the laser chip 23a (TM mode in FIG. 5). The direction of polarization of the laser beam at the wavelength of 785 nm is parallel with an active layer of the laser chip 23b (TE mode in FIG. 5).

It is necessary for the direction of polarization of the laser beam incident on the polarizing diffraction grating 15 to be parallel with the grating slits 15a (that is, perpendicular to the surface of paper in FIG. 12). For example, the active layers of the laser chips 23a and 23b may be orientated in directions perpendicular to each other. Alternatively, the thickness of the phase plate 4 may be controlled so as to produce a phase difference which is an integral multiple of the wavelength in one of the laser beams having a first wavelength and produce a phase difference of $\lambda/2$ in the other laser beam having a second wavelength.

As shown in FIG. 14, the phase plate 4, the polarizing diffraction grating 15 and the $\lambda/4$ plate 6 may be integral with each other. Alternatively, these elements may be provided at a laser beam emitting window of the laser unit 23.

By using such a laser unit, the number of parts is reduced and the size of the apparatus is reduced. In addition, the number of processes required to assemble the optical system is reduced so that the cost is reduced accordingly.

By forming the components to be integral with each other, reliability with respect to a variation in temperature and humidity and a variation with time is improved.

By arranging the laser chips 23a and 23b, emitting laser beams at right angles to each other in direction of polarization, such that the active layers thereof are perpendicular to each other, it is ensured that the laser beams incident on the polarizing diffraction grating 15 via the phase plate 4 are identically polarized. Thus, the efficiency in using the upstream and downstream laser beams is improved.

In case the laser chips 23a and 23b, emitting laser beams at right angles to each other in direction of polarization, such that the active layers thereof are parallel with each other, the phase plate 4 is provided such that a phase difference which is an integral multiple of the wavelength is provided to one of the laser beams and a phase difference which is approximately ½ of the wavelength is provided to the other laser beams. In this way, it is ensured that the laser beams incident on the polarizing diffraction grating 15 are identically polarized so that the efficiency in using the upstream and downstream laser beams is improved.

Figure 15A:
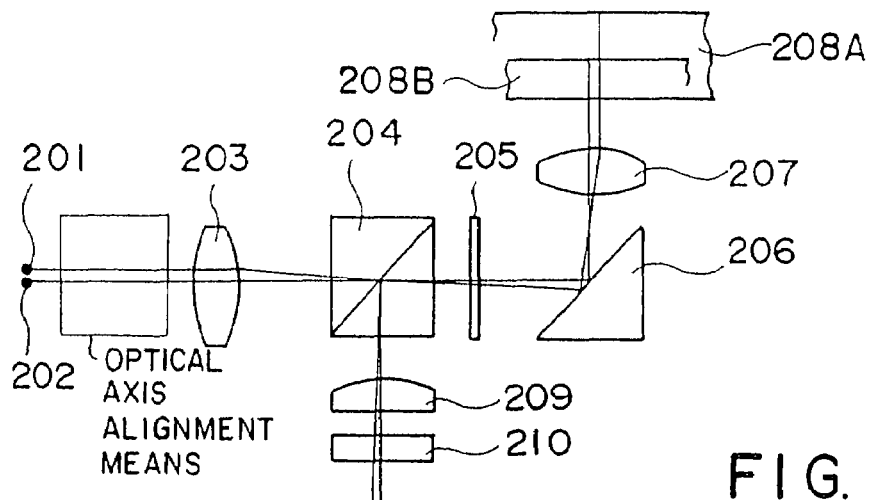
FIG. 15A shows an optical pickup apparatus according to a fifth embodiment of the present invention.

FIG. 15A shows an optical pickup apparatus according to a fifth embodiment of the present invention. Referring to FIG. 15A, the optical pickup apparatus comprises a first light source (LD) 201 and a second light source (LD) 202. The first light source 201 is a semiconductor laser emitting a laser beam at a wavelength of 785 nm and the second light source 202 is also a semiconductor laser emitting a laser beam at a wavelength of 650 nm. The wavelength varies from laser to laser and also varies with temperature so that the actual wavelength may be variable by ±20 nm around the aforementioned wavelength.

The optical pickup apparatus further comprises a low-capacity optical disk 208A having a base thickness of 1.2 mm and a high-capacity optical disk 208B having a base thickness of 0.6 mm. For the purpose of description, the low-capacity optical disk 208A and the high-capacity optical disk 208B are illustrated to overlap each other.

The first light source 201 is driven when a writing operation or a reading operation is performed in the low-capacity optical disk 208A. A laser beam from the light source 201 is transmitted through a coupling lens 203, a polarizing beam splitter 204 and a phase plate 205. The laser beam is then reflected by a polarizing prism 206 and incident on an objective lens 207. The objective lens 207 converges the incident beam. The converged beam is transmitted through the base of the low-capacity optical disk 208A so as to form a beam spot on a recording surface. The beam reflected by the recording surface is transmitted through the objective lens 207 and proceeds as a return beam. The return beam is reflected by the polarizing prism 206, transmitted through the phase plate 205, reflected by the polarizing beam splitter 204, transmitted through a converging lens 209 and a cylindrical lens 210, and incident on a photosensitive means 211.

The light source 202 is driven when a writing operation or a reading operation is performed in the high-capacity optical disk 208B. A laser beam emitted by the light source 202 is transmitted through the coupling lens 203, the polarizing beam splitter 204 and the phase plate 205. The laser beam is then reflected by the polarizing prism 206 and incident on the objective lens 207. The objective lens 207 converges the incident beam. The converged beam is transmitted through the base of the low-capacity optical disk 208B so as to form a beam spot on a recording surface. The beam reflected by the recording surface is transmitted through the objective lens 207 and proceeds as a return beam. The return beam is reflected by the polarizing prism 6, transmitted through the phase plate 205, reflected by the polarizing beam splitter 204, transmitted through the converging lens 209 and the cylindrical lens 210, and incident on a photosensitive means 211.

The laser beam emitted by the light sources 201 and 202 is polarized in a direction parallel with the surface of paper. In an upstream optical path leading from the light source to an optical disk, the laser beam is transmitted through the polarizing beam splitter 204 as a P-polarized beam. The phase plate 205 is constructed such that a vapor is deposited on a transmitting glass base to form a film thereon. The vapor-deposited film operates as a ¼ wave plate with respect to the laser beam from the light sources 201 and 202. Accordingly, the laser beam exiting the light source and transmitted through the phase plate 205 is transformed from a linearly-polarized beam into a circularly-polarized beam. The return beam from the recording surface of the optical disk is a circularly-polarized beam having a direction of traverse opposite to that of an upstream beam. The return beam exiting the phase plate 205 is transformed into a linearly-polarized beam having a plane of polarization perpendicular to that of the upstream beam. The return beam exiting the phase plate 205 is reflected by the polarizing beam splitter 204 as an S-polarized beam. That is, the polarizing beam splitter 204 and the phase plate 205 constitute optical path separating means.

The return beam reflected by the polarizing beam splitter 204 is converged by the converging lens 209 and supplied by the cylindrical lens 210 with astigmatism before entering the photosensitive means 211. In the photosensitive means 211, a focus error signal is produced by a known method based on astigmatism and a tracking error signal is produced by a known method based on a phase difference. A controlling means (such as a microcomputer or a CPU not shown) performs focusing control and tracking control based on the focus error signal and the tracking error signal, respectively. The photosensitive means 211 also outputs a readout signal.

The converging lens 209, the cylindrical lens 210 and the photosensitive means 211 constitute detecting means. A single lens having a convex spherical surface and a convex cylindrical surface may be used to replace the converging lens 209 and the cylindrical lens 210. The focusing control may alternatively performed using a known knife edge method or the like instead of the astigmatism method. The tracking control may alternatively performed using a push-pull method or another appropriate known method. The detecting means may appropriately constructed depending on which of these methods are employed to perform the focusing control and the tracking control.

In the construction shown in FIG. 15A, the optical axis of the light source 202 is aligned with the optical axis (referred to as a system axis) of the optical system including the coupling lens 203 and the like. However, the optical axis of the light source 201 is displaced from the system axis. For this reason, the location of the return beam incident on the photosensitive means 211 varies depending on which of the light sources 201 and 202 is driven. A set of photosensitive means 211 may be provided for each of the return beam. Alternatively, the location of the photosensitive means 211 is controlled depending on which of the light sources 201 and 202 is driven so that the return beam is incident on a proper location on the photosensitive means 211. Alternatively, an offset commensurate with the displacement of the location of incidence of the return beam may be provided to the focus error signal and the tracking error signal.

Figure 15B:
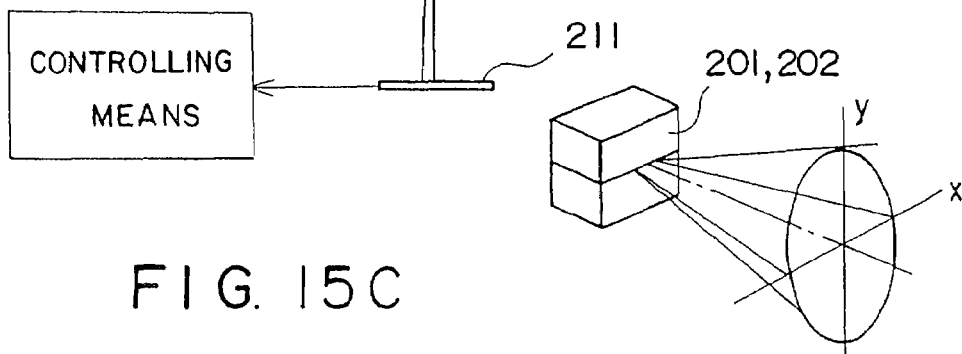
FIG. 15B shows a laser beam emitted by a light source.

A description will now be given of collimating and beam shaping actions performed by the coupling lens 203. FIG. 15B shows a laser beam emitted by the light source (the light source 201 or the light source 202). The laser beam emitted by the light source is divergent. The angle of divergence is maximum in the y direction (that is, the direction of the major axis of a far field pattern (the elliptical shape in FIG. 15B)) which is perpendicular to the active layer and is minimum in the x direction (that is, the direction of the minor axis of the far field pattern). The ratio between the minimum angle of divergence and the maximum angle of divergence is determined by the type of the light source and resides in a range of 1:2-1:4.

The coupling lens 203 is a single lens that provides a collimating action for transforming the laser beam from the light source 201 or the light source 202 into a substantially parallel beam and provides a beam shaping action for expanding the diameter of the beam diameter in the direction of the minimum angle of divergence so as to approximate the section of the beam to a circular configuration.

That is, the coupling lens 203 is an anamorphic lens optically operating differently in the x direction and in the y direction.

Figure 15C:
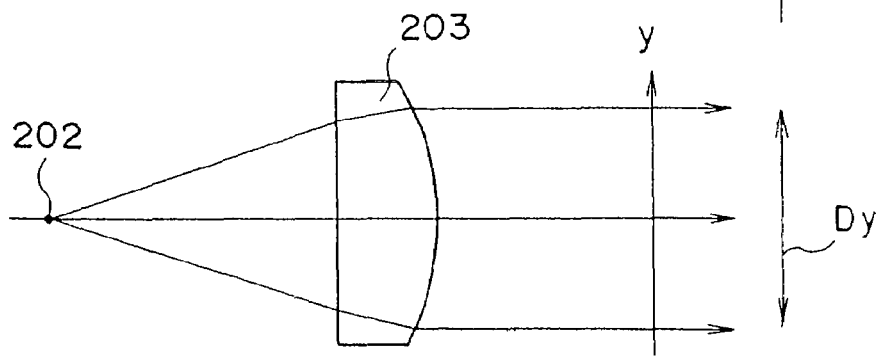
FIG. 15C shows an optical performance of a coupling lens in the y direction.

FIG. 15C shows an optical performance of the coupling lens 203 in the y direction. The laser beam from the light source 202 has a relatively large angle of divergence in the y direction. The coupling lens 203 provides a simple collimating action in the y direction to the incident divergent beam so as to transform the incident beam into a substantially parallel beam having a diameter of Dy.

Figure 15D:
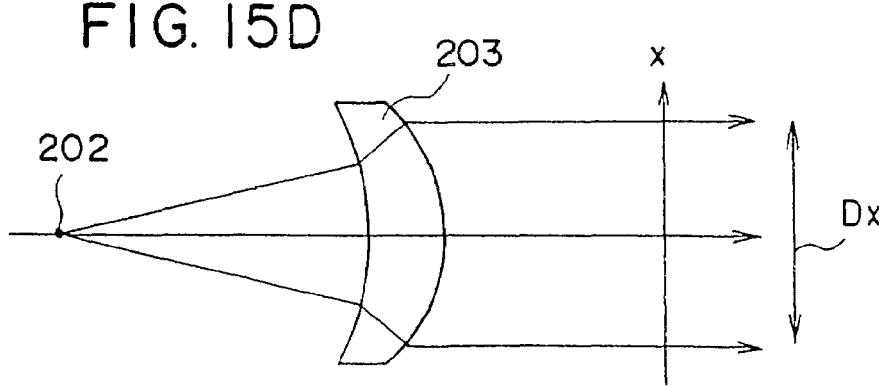
FIG. 15D shows an optical performance of the coupling lens in the x direction.

FIG. 15D shows an optical performance of the coupling lens 203 in the x direction. The laser beam from the light source 202 has a relatively small angle of divergence in the x direction. The coupling lens 203 expands the angle of divergence in the x direction by refraction at the surface of incidence. At the exit surface, the beam is collimated into a parallel beam having a diameter of Dx. The optical performance in the x direction is controlled so that the diameter Dy is approximately equal to Dx. That is, the beam coupled by the coupling lens 203 is simultaneously shaped-such that Dx≈Dy. While FIGS. 15C and 15D show the light source 202, the description above applies to the beam from the light source 201 as well.

Since the coupling lens 203 provides collimating and beam shaping actions, it is not necessary to use an optical element such a pair of prisms or a cylindrical lens exclusively used for beam shaping. Thus, a compact optical pickup apparatus can be produced.

Chromatic aberration produced in the coupling lens 203 due to a difference in wavelength of the beams from the light sources 201 and 202 does not pose a serious problem in practical applications. Of course, the coupling lens 203 may be formed as a junction lens formed by two lenses having different Abbe's number in order to correct the chromatic aberration. The coupling lens 203 may alternatively have an aspherical surface such that the collimating performance and the beam shaping performance are optimized for the wavelength of the beam emitted by the light source.

In the construction of FIG. 15A, the optical axis of the light source 202 is aligned with the system axis and the optical axis of the light source 201 is not aligned with the system axis. This requires that an offset be provided to retrieved signals depending on whether the light source 201 or the light source 202 is driven or that a photosensitive unit be provided for each of the return beams. Such arrangements may be eliminated by providing an optical axis aligning means for aligning the optical axis of both the light source 201 and the light source 202 with the system axis.

FIGS. 16A-16D show an optical pickup apparatus according to a variation of the fifth embodiment.

Figure 16A:
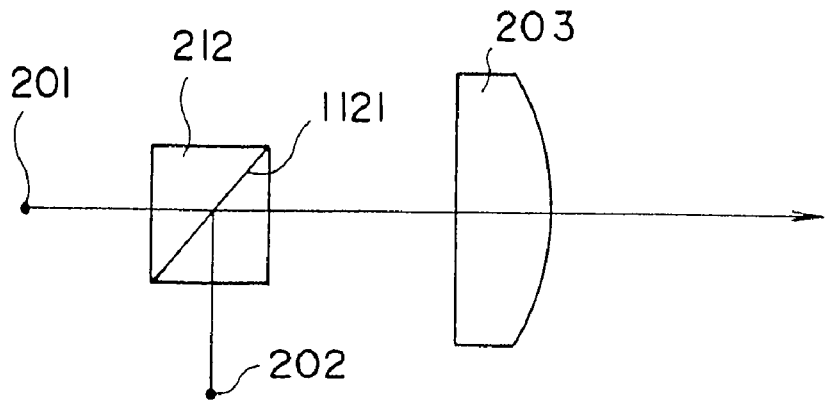
FIGS. 16A and 16B show arrangements where a prim element is used as an optical axis aligning means.

FIG. 16A shows an arrangement where a prim element 212 is used as the optical axis aligning means. The prism element 212 selectively reflects or transmits an incident beam depending on the polarization thereof. More specifically, a film 1121 formed in the prism element 212 reflects an S-polarized beam and transmits a P-polarized beam.

The laser beam from the light source 201 is a P-polarized beam so that it is transmitted through the film 1121. The laser beam from the light source 202 is an S-polarized beam so that it is reflected by the film 1121. The arrangement of the light sources 201, 202, the prism element 212 and the coupling lens 203 is defined such that both the beam transmitted through the film 1121 and the beam reflected by the film 1121 have optical axes thereof (rays having an angle of divergence of 0) aligned with the optical axis of the coupling lens 203.

Figure 16B:
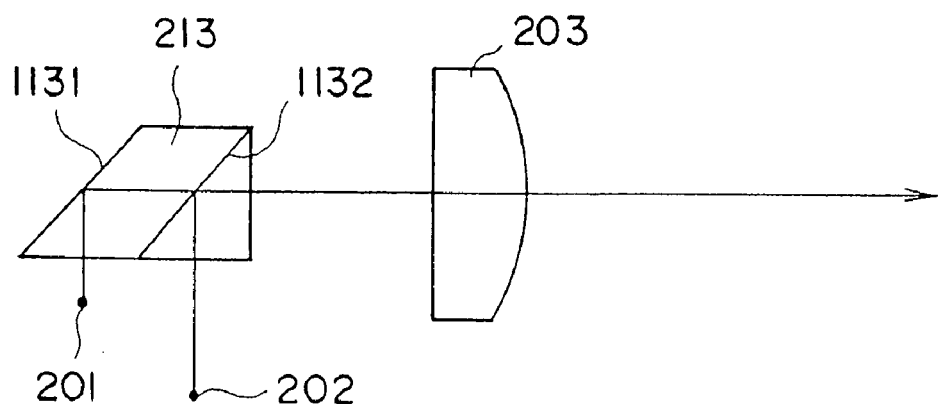

FIG. 16B shows an arrangement where a prism element 213 is used as the optical axis aligning means. The prism element 213 also selectively reflects or transmits an incident beam depending on the polarization thereof. More specifically, a film 1132 formed in the prism element 213 reflects an S-polarized beam and transmits a P-polarized beam. A slanted surface 1131 operates as a reflecting surface.

The laser beam from the light source 201 is P-polarized so that it is reflected by the slanted surface 1131 and transmitted through the film 1132. The laser beam from the light source 202 is S-polarized so that it is reflected by the film 1132. The arrangement of the light sources 201, 202, the prism element 213 and the coupling lens 203 is defined such that both the beam transmitted through the film 1132 and the beam reflected by the film 1132 have optical axes thereof (rays having an angle of divergence of 0) aligned with the optical axis of the coupling lens 203.

In the construction shown in FIGS. 16A and 16B, it is assumed that the two beams incident on the film 1121 or the film 113 are polarized in respective directions that are at right angles to each other.

Figure 16C:
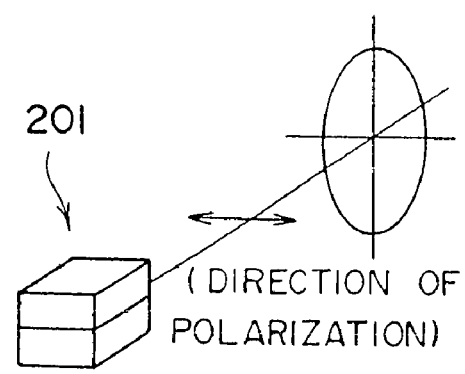
FIG. 16C shows a TE-mode emission.

The laser beam emitted by a semiconductor laser embodying the light source 201 or the light source 202 is substantially linearly polarized where the direction of polarization is parallel with the active layer (the x direction in FIG. 15B). Such a laser oscillation is referred to as a TE-mode emission in which the direction of oscillation of the electric (E) field of the laser beam is parallel with the active layer. FIG. 16C shows that the light source 201 produces a TE-mode emission.

In order for the construction of FIGS. 16A and 16B to be viable, the light source 201 is to be arranged such that the laser beam emitted therefrom is P-polarized with respect to the films 1121 and 1132. Assuming that the light source 202 also produces TE-mode emission, the light source 202 is to be arranged in the construction of FIGS. 16A and 16B such that the laser beam emitted therefrom is S-polarized with respect to the films 1121 and 1132.

However, with the above-described arrangement, the beams incident on the coupling lens 203 is such that the major axis of the far field pattern of the beam from the light source 201 is perpendicular to that of the beam from the light source 202. Since the coupling lens 203 is an anamorphic lens, the two beams fail to be processed identically by the coupling lens 202.

Accordingly, the light source 202 is constructed so as to produce a TM-mode emission.

Figure 16D:
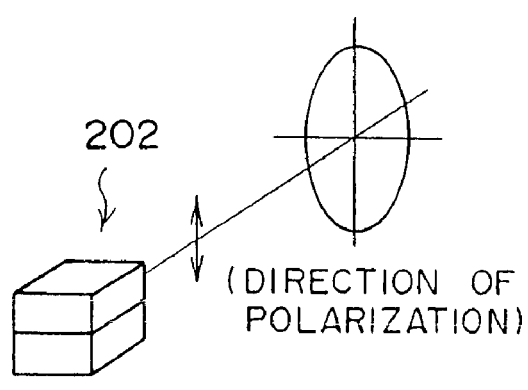
FIG. 16D shows a TM-mode emission.

FIG. 16D shows that the light source 202 produces a TM-mode emission. In the TM-mode emission, the direction of polarization (the direction of oscillation of the electric field E) of the emitted laser beam is parallel with a direction perpendicular to the direction in which the active layer lies. The name TM-mode emission derives from the fact that the direction of oscillation of the magnetic (M) field of the emitted laser beam is parallel with the active layer. A light source with a wavelength of 635 nm is known to produce a TM-mode emission. When the light source 202 is embodied by such a light source, the high-capacity optical recording medium 8B is constructed to be adapted for the wavelength of 635 nm.

By using a light source producing a TE-mode emission as the light source 201 and a light source producing a TM-mode emission as the light source 202, it is ensured that the laser beams from the light sources 201 and 202 are polarized in respective directions that are perpendicular to each other and the respective directions of the major axis of the respective far field patterns are parallel with each other. Of course, the modes of emission may be reversed such that the light source 201 produces a TM-mode emission a TE-mode emission and the light source 202 produces a TE-mode emission.

In the optical pickup apparatus of FIGS. 16A and 16B, the optical system including the coupling lens 203 and the like is the same as that of FIG. 15A. However, since the optical axis of the laser beams of the light sources 201 and 202 is aligned with the optical axis of the coupling lens 203, the location of the incidence on the photosensitive means 211 remains unchanged for both return beams.

When the prism element with a variable transmissivity or reflectivity with respect to an incident beam that depends on the polarization thereof is used to implement the optical axis aligning means and when the light sources 201 and 202 provide the same emission mode, a phase plate may be introduced so as to rotate the plane of polarization of the laser beam from one of the light sources by 90 degrees so that the directions of the major axis of the respective far field patterns are parallel with each other.

A known ½ wave plate provides such an action.

Figure 17A:
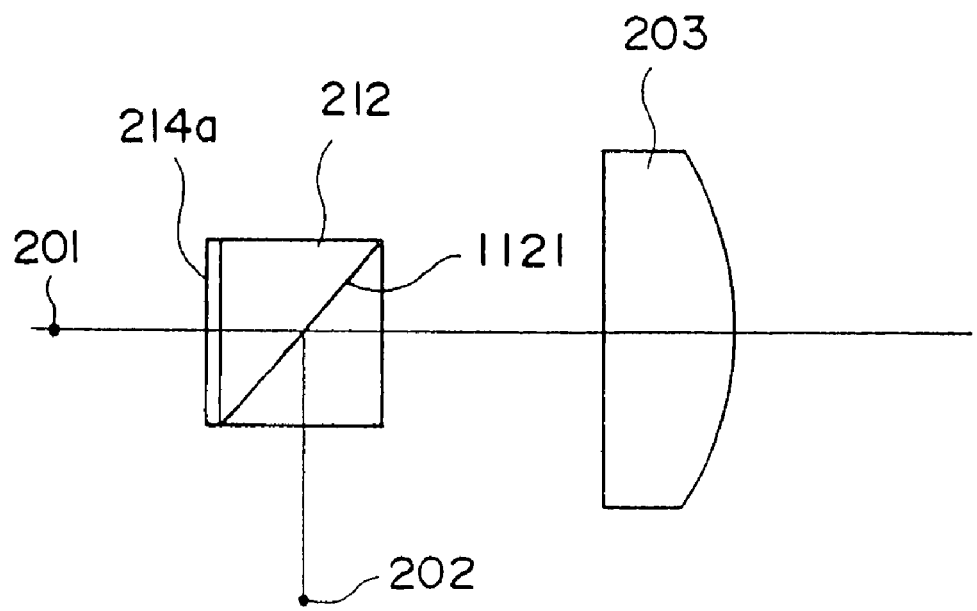
FIG. 17A shows a ½ wave plate provided at a surface of a prism element.
Figure 17B:
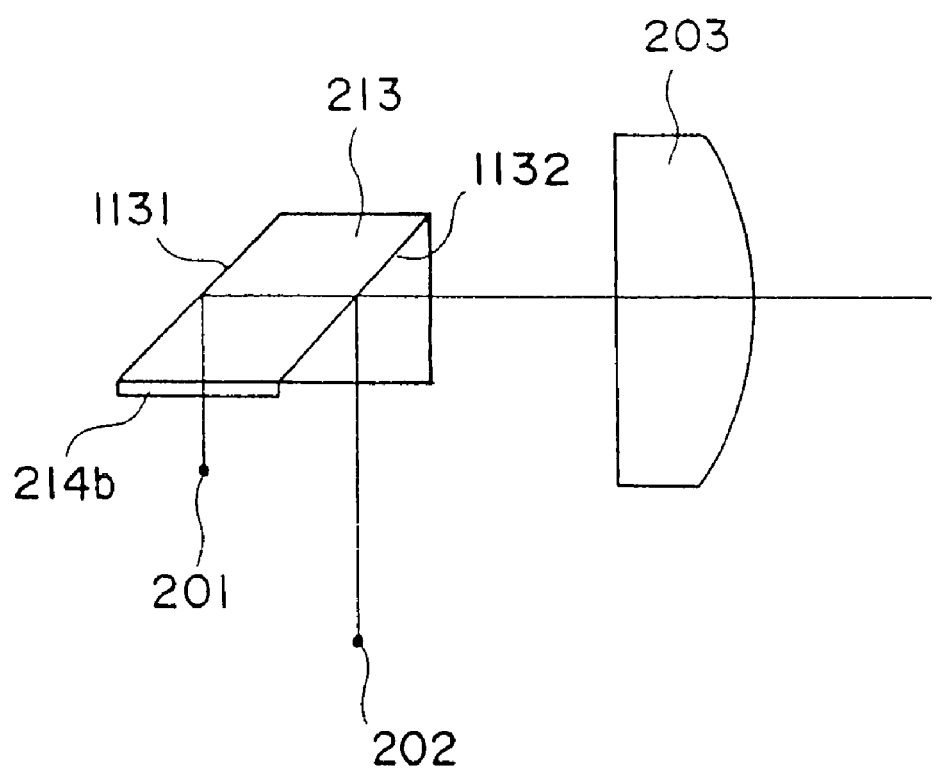
FIG. 17B shows a ¼ wave plate provided at a surface of a prism element.

For example, as shown in FIG. 17A, a ½ wave plate 214a (the phase plate) may be provided at the surface of the prism element 212 of FIG. 16A facing the light source 201. Alternatively, as shown in FIG. 17B, a ¼ wave plate 214b may be provided at the surface of the prism element 213 of FIG. 16B on which the laser beam from the light source 201 is incident. With this arrangement, it is possible to use the same emission mode in the light sources 201 and 202.

While the optical axis aligning means shown in FIGS. 16A-17B is implemented by a prism element with a variable transmissivity or reflectivity with respect to an incident beam that depends on the polarization thereof, elements other than those using polarization may be used to implement the optical axis aligning means.

The prism elements 212 and 213 of FIGS. 16A and 16B, respectively, may be implemented by a prism element with a variable transmissivity or reflectivity with respect to an incident beam that depends on the wavelength thereof. A well-known dichroic filter transmits a beam in a specific wavelength region and reflects a beam outside that wavelength region.

The film 1121 of the prism element 212 of FIG. 16A or the film 1132 of the prism element 213 of FIG. 16B may be formed as a dichroic film capable of transmitting the laser beam from the light source 201 (wavelength: 785 nm) and reflecting the laser beam from the light source 202 (wavelength: 650 nm). With this arrangement, both the light sources 201 and 202 may provide the TE-mode emission so that the directions of polarization of the beams are parallel with each other and the directions of the major axis of the respective far field patterns are also parallel with each other.

The optical axis aligning means may also be implemented by a prism characterized by a beam separation performance that depends on polarization and wavelength.

Figure 18A:
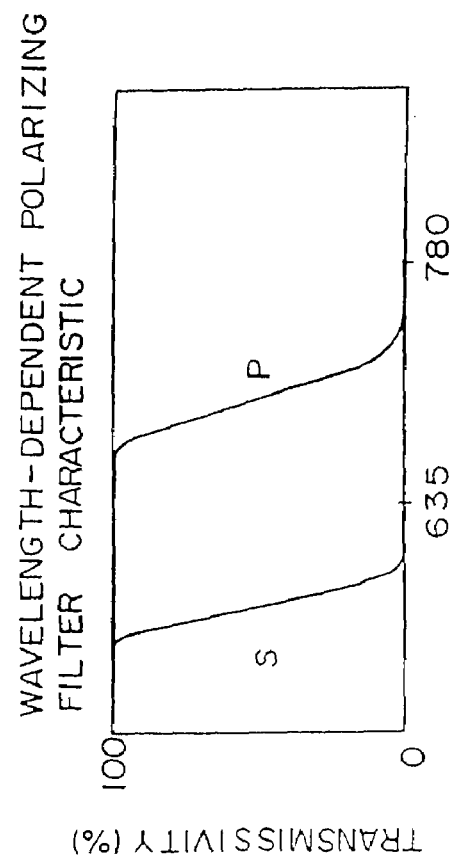
FIG. 18A shows a prism providing a wavelength-dependent polarization filter performance.
Figure 18B:
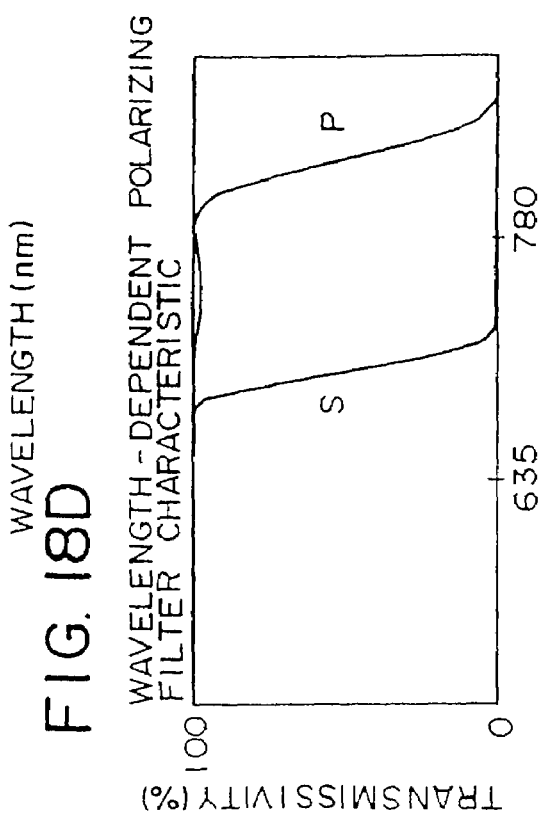
FIG. 18B is a graph showing a wavelength-dependent polarization filter characteristic of the prism of FIG. 18A.

FIGS. 18A and 18B show such prisms. A film 1121' of a prism element 212A' shown in FIG. 18A has a wavelength-dependent polarization filter characteristic as shown in FIG. 18B. Transmissivity with respect to S-polarization and P-polarization varies with wavelength as indicated by the graph.

Since the wavelength of the laser beam from the light source 201 is 785 nm, the laser beam from the light source 201 is reflected by the film 1121' irrespective of whether the beam is S-polarized or P-polarized. The laser beam from the light source 202 has a wavelength of 650 nm so that it is transmitted through the film 1121' if P-polarized. By arranging the light sources 201 and 202 to be operated in the same emission mode and ensuring that a P-polarized beam is incident on the film 1121' as shown in FIG. 18A, a desirable optical axis alignment is achieved.

Figure 18C:
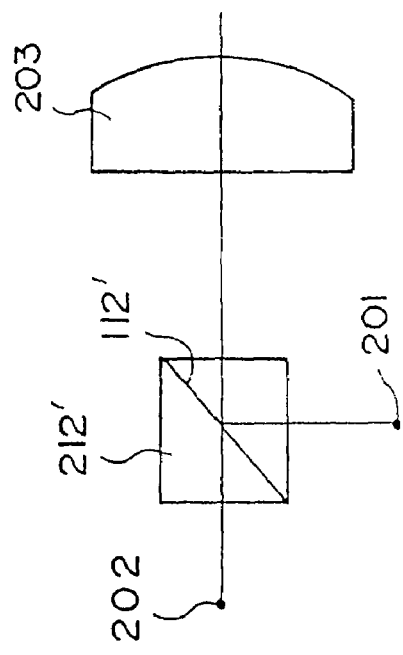
FIG. 18C shows another prism providing a wavelength-dependent polarization filter performance.
Figure 18D:
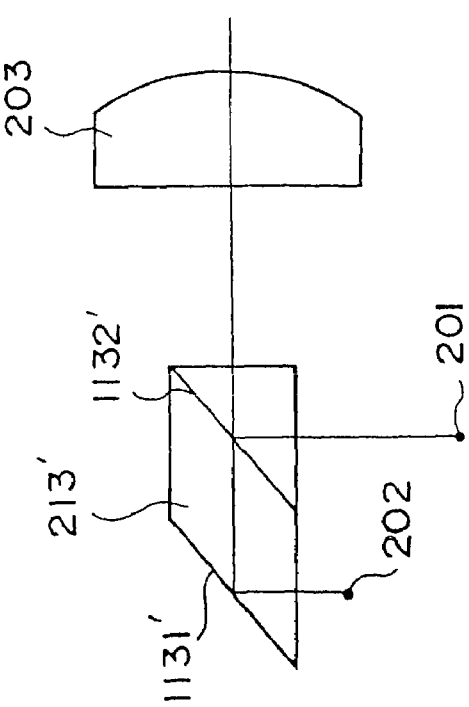
FIG. 18D shows a graph showing a wavelength-dependent polarization filter characteristic of the prism of FIG. 18C.

A film 1132' of a prism element 213' shown in FIG. 18C having a reflecting surface 1131' has a wavelength-dependent polarization filter characteristic as shown in FIG. 18D. Transmissivity with respect to S-polarization and P-polarization varies with wavelength as indicated by the graph. Since the wavelength of the laser beam from the light source 201 is 785 nm, the laser beam from the light source 201 is reflected by the film 1132' when it is S-polarized. The laser beam from the light source 202 has a wavelength of 650 nm so that it is transmitted through the film 1132' irrespective of the polarization.

By arranging the light sources 201 and 202 to be operated in the same emission mode and providing S-polarization to the beam incident on the film 1132' as shown in FIG. 18C, a desired optical axis alignment is achieved. The film 1121' may have a characteristic as shown in FIG. 18B and the film 1132' may have a characteristic as shown in FIG. 18D.

Figure 19A:
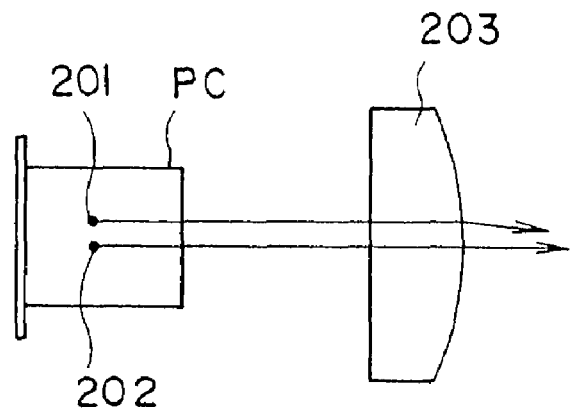
FIGS. 19A and 19B show how two light sources of an optical pickup apparatus may be accommodated in the same package.
Figure 19B:
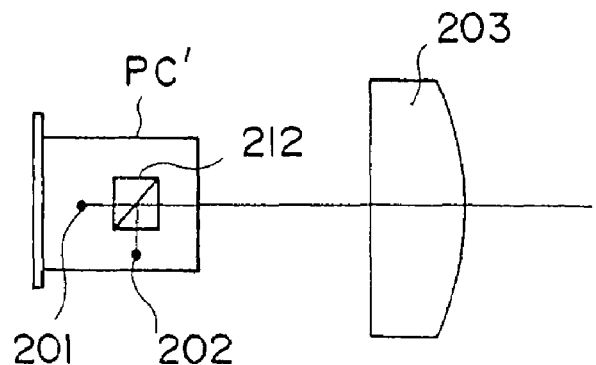

FIGS. 19A and 19B show how two light sources of an optical pickup apparatus may be accommodated in the same package. FIG. 19A shows an arrangement where the light sources 201 and 202 are accommodated in the same package PC. The optical system including the coupling lens 203 and the like that serves the optical recording medium, the optical path separating means and the detecting means are not illustrated but are similarly constructed as shown in FIG. 15A.

FIG. 19B shows an arrangement where the light sources 201 and 202 are accommodated in the same package PC' and the prism element 212 described as the optical axis aligning means with reference to FIG. 16A is used to align the optical axes of the laser beams from the light sources 201 and 202. The optical system including the coupling lens 203 and subsequent elements are arranged similarly as shown in FIG. 15A. Since the optical axes of the laser beams from the light sources are aligned to each other, the return beams are incident on the same location of the photosensitive means.

Of course, the construction of FIG. 19B may be varied so as to include any of the optical axis aligning means as described with reference to FIGS. 16B, 17A, 17B and 18A-18D.

Figure 20A:
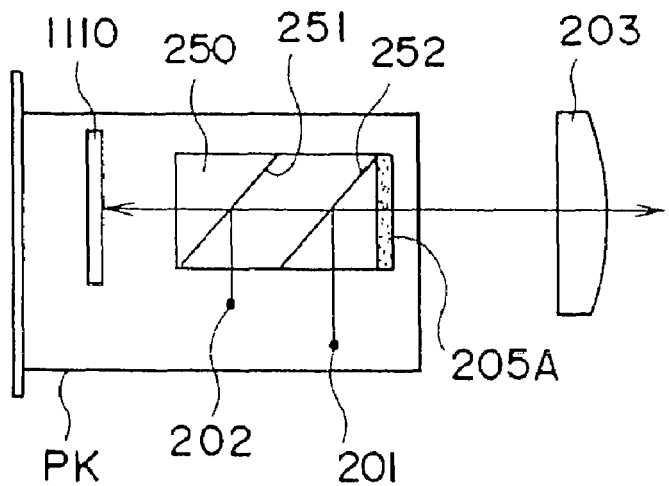
FIG. 20A a variation of the package that accommodates the light sources.
Figure 20B:
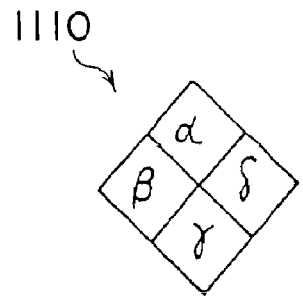
FIG. 20B shows a construction of a photosensitive means.

FIGS. 20A and 20B show a variation of the package that accommodates the light sources 201 and 202.

Referring to FIG. 20A, a package PK includes the light sources 201, 202, a prism element 250 that serves as the optical axis aligning means, a phase plate 205A and a photosensitive means 1110 (detecting means). It is assumed that the light sources 201 and 202 both provide the TE-mode emission, the light source 201 emitting a laser beam at a wavelength of 785 nm and the light source 202 emitting a laser beam at a wavelength of 650 nm. The prism 250 includes films 251 and 252. The film 251 is a polarization-dependent reflecting film for reflecting an S-polarized beam and transmitting a P-polarized beam. The film 252 has a wavelength-dependent polarization filter characteristic as shown in FIG. 18D. The light sources 201 and 202 emit S-polarized laser beams to the films 252 and 251, respectively.

When the light source 202 is driven, the S-polarized laser beam at the wavelength of 650 nm is reflected by the film 251, transmitted through the film 251 and incident on the coupling lens 203 via the phase plate 205A. When the light source 201 is driven, the S-polarized laser beam at the wavelength of 785 nm is reflected by the film 252 and incident on the coupling lens 203 via the phase plate 205A.

The phase plate 205A transforms linear polarization into circular polarization and transforms circular polarization into linear polarization. That is, the phase plate 205A operates as a ¼ wave plate. The function provided by the phase plate 205A is the same as that of the phase plate 205 of FIG. 15A. In a single-beam optical pickup apparatus, only one beam (one wavelength) is used so that the ¼ wave plate in the apparatus may be an ordinary plate. However, in the optical pickup apparatus of the invention, two laser beams of different wavelength are used for writing and reading of information so that the phase plate 205A (205) should function as a ¼ wave plate for both laser beams.

Such a phase plate is implemented as described below.

It is assumed that a difference, caused by a birefringent material forming the phase plate 205A, between the refraction index for an ordinary ray and that of an extraordinary ray is such that the difference in refraction index is indicated by $N_1$ for the wavelength $\lambda_1$ (785 nm) and $N_2$ for the wavelength $\lambda_2$ (650 nm). Assuming that the birefringent material has a thickness of d, the phase difference between the ordinary ray and the extraordinary ray transmitted through the birefringent material is equal to ¼ of the wavelength under the following conditions.

$$N_1 * d = (k_1 + 1/4)\lambda_1, N_2 * d = (k_2 + 1/4)\lambda_2$$

where $k_1$ and $k_2$ indicate integers.

Therefore, by setting the integers $k_1$ and $k_2$ so as to satisfy $(k_1+1/4)\lambda_1/N_1=(k_2+1/4)\lambda_2/N_2$, the thickness d of the phase birefringent material which allows the phase plate to operate as a ¼ wave plate for the laser beams at the wavelength $\lambda_1$ and $\lambda_2$.

Such a phase plate may be formed as a vapor-deposited film.

Referring back to FIG. 20A, the laser beam transmitted through the coupling lens 203 may also be transmitted through a polarizing prism depending on needs before being converged by an objective lens so as to form a beam spot on a recording surface of the optical recording medium. The laser beam reflected by the recording surface is transmitted through the objective lens as a return beam. The return beam is incident on the phase plate 205A via the coupling lens 203. The phase plate 205A returns the return beam to a linearly-polarized beam. Since the beam exiting the phase plate 205A is P-polarized with respect to the films 251 and 252, the return is transmitted through the films 251 and 252 irrespective of the wavelength and incident on the photosensitive means 1110. As shown in FIG. 20B, the photosensitive means 1110 is constructed as a quadruply-sect elements the vertical axis of which is parallel with the vertical axis of the arrangement of FIG. 20A. Photosensitive surfaces α, β, γ and δ output signals Sα, Sβ, Sγ and Sδ, respectively.

The photosensitive means 1110 is configured such that the return beam is converged to the center where the quadruple sections meet where the tracking error is zero. Since the coupling lens 203 is an anamorphic lens providing a collimating action in the direction of the major axis of the far field pattern of the laser beam from the light source and providing a beam shaping action in the direction of the minor axis thereof. Therefore, a astigmatism is produced such that the point of convergence of the beam spot converged by the objective lens is displaced from the target recording surface. Accordingly, a focus error signal may be obtained in the form of (Sα+Sγ)−(Sβ+Sδ) according to the focusing control based on astigmatism. A tracking error signal may be obtained in the form of (Sβ-Sδ) according to the tracking control based on a push-pull method or a phase difference method. A readout signal is obtained in the form of (Sα+Sγ+Sβ+Sδ).

The phase plate 205A and the prism element 250 constitute the optical path separating means. The photosensitive means 1110 and the coupling lens 203 constitute the detecting means.

The first and second light sources are accommodated in the same package PK as the other optical elements.

Figure 21:
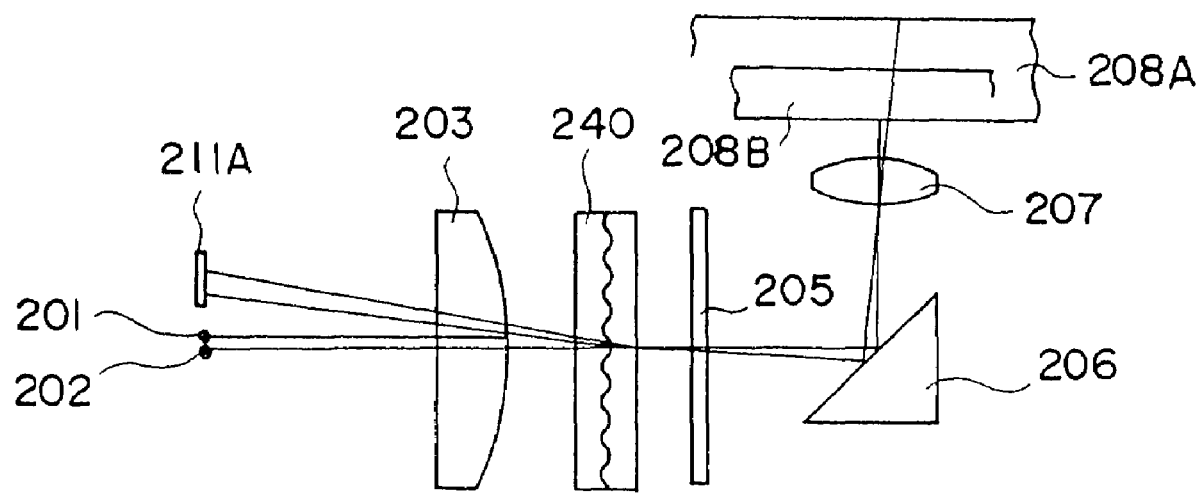
FIG. 21 shows a variation of the optical pickup apparatus of FIG. 15A.

FIG. 21 shows a variation of the optical pickup apparatus of FIG. 15A.

In this variation, a polarizing hologram 240 is provided as the optical path separating, means. The coupling lens 203 and the photosensitive means 211A constitute the detecting means.

The polarizing hologram 240 is constructed to provide diffraction when the direction of polarization of the beam is parallel with a groove of the hologram and does not provide diffraction when the direction of polarization is perpendicular to the groove.

The beam emitted by the light source 201 or the light source 202 is collimated and shaped by the coupling lens 203 so that the beam is not subject to diffraction by the polarizing hologram 240 and is transmitted therethrough. The beam exiting the polarizing hologram 240 is transformed by the phase plate 205 into a circularly-polarized beam and is incident on the objective lens 207 via the deflecting prism 206, so as to form a beam spot on the recording surface of the optical disk 208A or the optical disk 208B.

The beam reflected by the recording surface is transmitted through the objective lens 207 as a return beam. The return beam is reflected by the deflecting prism 206 and transmitted through the phase plate 205 so as to be transformed into a linearly-polarized beam polarized in an opposite direction of the beam incident on the phase plate 205. The beam exiting the phase plate 205 is diffracted by the polarizing hologram 240 and incident on the photosensitive means 211A via the coupling lens 203.

Figure 25B:
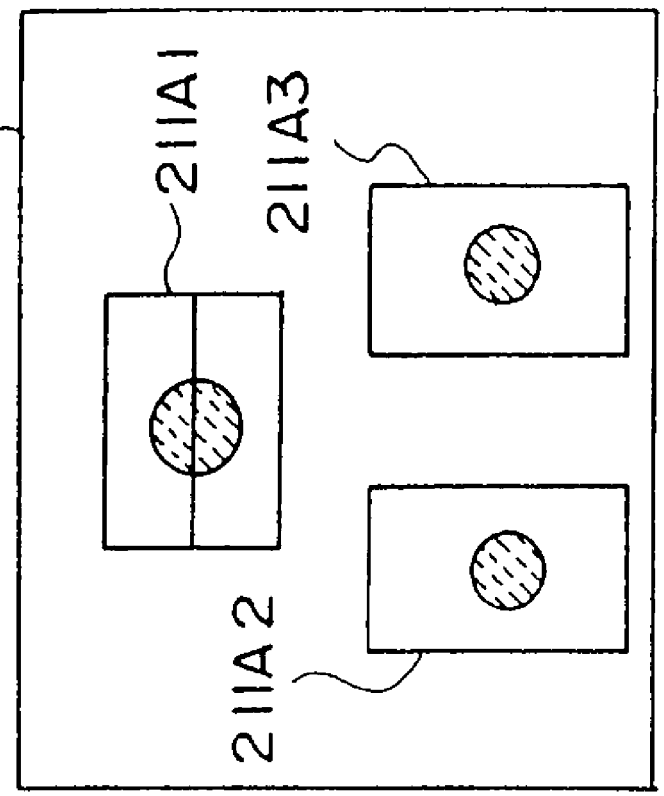
FIG. 25B shows a construction of a photosensitive means.
Figure 25A:
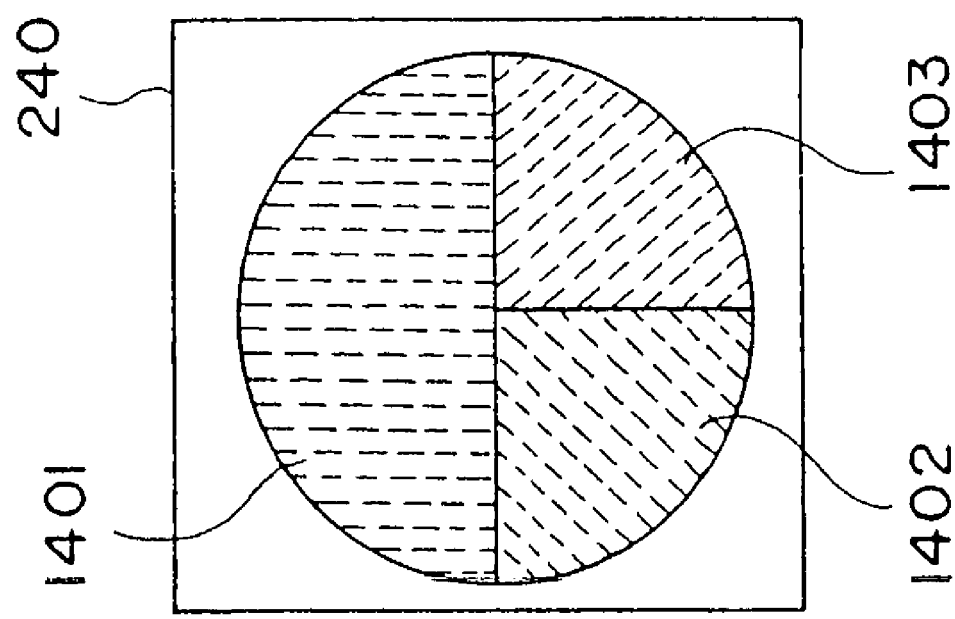
FIG. 25A shows a construction of a polarizing hologram.

FIG. 25A shows a construction of the polarizing hologram 240. FIG. 25B shows a construction of the photosensitive means 211A. Referring to FIG. 25A, the polarizing hologram 240 comprises three hologram portions 1401, 1402 and 1403 providing different diffractive actions. The return beam portion incident on the hologram portion 1401 is incident on a bisected photosensitive portion 211A1 of the photosensitive means 211A shown in FIG. 25B. The return beam portions incident on the hologram portions 1402 and 1403 are incident on the photosensitive portions 211A2 and 211A3, respectively. The incident beams are converged by the coupling lens 203 on respective photosensitive portions.

Straight-edged borders of the hologram portions 1401, 1402 and 1403 function as knife edges in the focusing control according to the knife edge method. The focus error signal for focusing control is formed as a difference between outputs from the respective photosensitive portions of the bisected photosensitive portions 211A1.

The tracking error signal for tracking control is formed as a difference between outputs from the photosensitive portions 211A2 and 211A3. Of course, the readout signal is obtained in the form of a sum of outputs from the photosensitive portions 211A1, 211A2 and 211A3.

In the embodiment of FIG. 21, the optical axes of the light sources 201 and 202 are not aligned. The three beam spots are incident on the photosensitive means 211A at difference locations depending on which light source is driven. For this reason, an appropriate offset is provided to the outputs so that a proper signal adapted for the light source is obtained.

Figure 22:
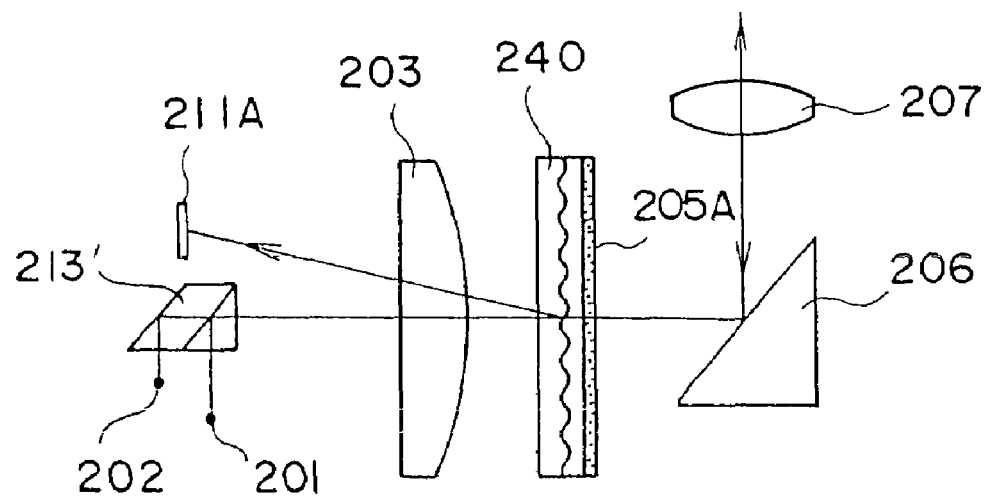
FIG. 22 shows another variation of the optical pickup apparatus of FIG. 15A.

FIG. 22 shows another variation of the optical pickup apparatus of FIG. 15A.

The optical path separating means is composed of the polarizing hologram 240 and the phase plate 205A formed to be integral with each other. The phase plate 205A operates as a ¼ wave plate for the beams having different wavelength from the first and second light sources.

The optical axes of the beams from the light source 201 and the light source 202 are aligned with the optical axis of the coupling lens 203, using the prism element 213'. More specifically, the wavelength-dependent polarization filter characteristic as shown in FIG. 18B is used for optical axis alignment. The beam incident on the coupling lens 203 is collimated and shaped thereby. The beam exiting the coupling lens 203 is transmitted through the polarizing hologram 240. The beam exiting the polarizing hologram 240 is transformed into a circularly-polarized beam by the phase plate 250 (that includes a vapor-deposited film described with reference to FIG. 20A and operating as a ¼ wave plate for the incident beam). The beam exiting the phase plate 205 is incident on the objective lens 207 via the deflecting prism 207 so as irradiate the optical recording medium (not shown).

The return beam from the optical recording medium is transformed back into a linearly-polarized beam after being transmitted through the phase plate 205A. The linearly-polarized beam is diffracted by the polarizing hologram 240 and is converged by the coupling lens 203 so as to be incident on the photosensitive means 211A. The description given above with reference to FIGS. 25A and 25B applies to the polarizing hologram 240 and the photosensitive means 211A of FIG. 22. The focus error signal, the tracking error signal and the readout signal are obtained as already described with reference to FIG. 25.

Figure 23:
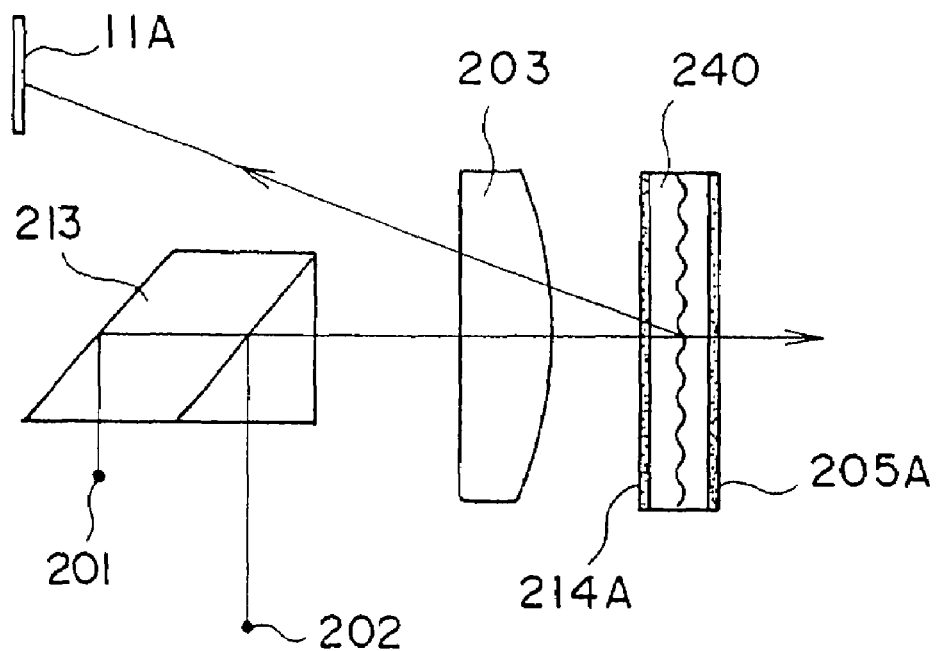
FIG. 23 shows still another variation of the optical pickup apparatus of FIG. 15A.

FIG. 23 shows still another variation of the optical pickup apparatus of FIG. 15A.

The optical path separating means is embodied by the polarizing hologram 240 having the phase plate 205A and a phase plate 214A integrally formed on respective surfaces of the polarizing hologram 240. The phase plate 214A has the function of rotating the plane of polarization of the one of the beams by 90°. The phase plate 205A operates as a ¼ wave plate for the beams.

The light source 201 provides the TE-mode emission and the light source 202 provides the TM-mode emission. Optical axis alignment is effected by the prism element 213 described with reference to FIG. 16B.

The beam emitted by the light source 201 or the light source 202 is collimated and shaped by the collimating lens 203 and incident on the phase plate 214A. The direction of polarization of the beam from the light source 201 and incident on the phase plate 214 is perpendicular to that of the beam from the light source 202.

The phase plate 214A operates as a ½ wave plate for one of the beams. More specifically, the phase plate 214A rotates the plate of polarization of one of the beams by 90° and maintaining the direction of polarization of the other beam. A description will be given below of the conditions to be met in order for the phase plate 214A to provide such a function.

It is assumed that a difference, caused by a birefringent material forming the phase plate 214A, between the refraction index for an ordinary ray and that of an extraordinary ray is such that the difference in refraction index is indicated by $N_1$ for the wavelength $\lambda_1$ (785 nm) and $N_2$ for the wavelength $\lambda_2$ (650 nm). Assuming that the birefringent material has a thickness of d, the phase difference between the ordinary ray and the extraordinary ray transmitted through the birefringent material is equal to the wavelength $\lambda_1$ under the following condition.

$$N_1 * d = (k_1 + 1)\lambda_1,$$

where $k_1$ indicates an integer.

The phase difference between the ordinary ray and the extraordinary ray is equal to ½ of the wavelength $\lambda_2$ under the following condition.

$$N_2 * d = (k_2 + \tfrac{1}{2})\lambda_2$$

where $k_2$ indicates an integer.

Therefore, by setting the integers $k_1$ and $k_2$ so as to satisfy $(k_1+1)\lambda_1/N_1 = (k_2+\tfrac{1}{2})\lambda_2/N_2$, the thickness d of the birefringent material which allows the phase plate 214A to operate as a transmitting film for the beam at the wavelength $\lambda_1$ and operate as a ½ wave plate for the beam at the wavelength $\lambda_2$. Such a phase plate may be formed as a vapor-deposited film.

The beams from the light sources 201 and 202 are transmitted through the polarizing hologram 240 without being subject to the diffractive action provided thereby. The beam exiting the polarizing hologram 240 is transformed by the phase plate 205A into a circularly-polarized beam and caused to irradiate the recording surface of the optical disk via the deflecting prism and the objective lens (not shown).

The return beam is transformed back into a linearly-polarized beam, diffracted by the polarizing hologram 240 and transmitted through the phase plate 214A. The beam exiting the phase plate 214A is incident on the photosensitive means 211A via the coupling lens 203 so as to produce signals. The description given already with reference to FIGS. 25A and 25B is applied to the polarizing hologram 240 and the photosensitive means 211A.

The phase plates 205A and 214A can be formed as vapor-deposited films. Magnesium fluoride ($MgF_2$) may be suitably used to construct such a film.

Figure 24:
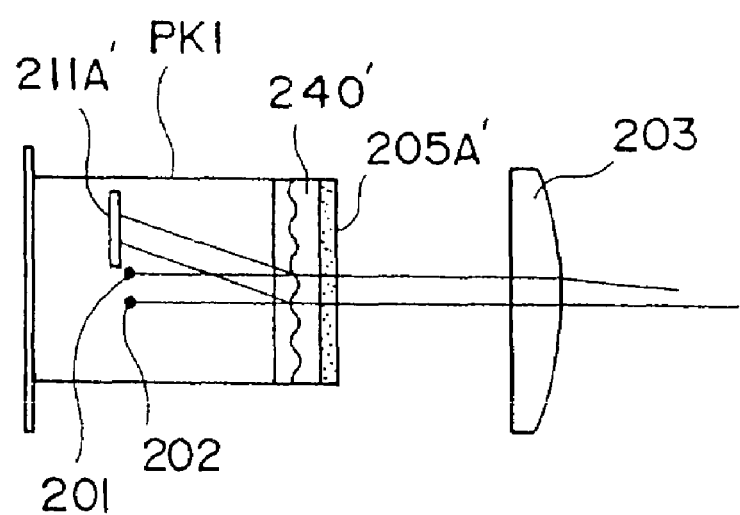
FIG. 24 shows yet another variation of the optical pickup apparatus of FIG. 15A.

FIG. 24 shows yet another variation of the optical pickup apparatus of FIG. 15A. A photosensitive means 211A' receiving the return beam split by the optical path separating means and retrieving information therefrom is accommodated in the same package PK1 as the first and second light sources 201 and 202. The optical path separating means comprises a polarizing hologram 240' and a phase plate 205A'. The phase plate 205A' operates as a ¼ wave plate for the beams. The optical path means is accommodated in the same package PK1 as the photosensitive means 211A' and the first and second light sources 201 and 202.

As described above, the polarizing hologram 240' and the phase plate 205A' may be disposed between the light sources and the coupling lens 203. The description already given with reference to FIGS. 25A and 25B applies to the polarizing hologram 240' and the photosensitive means 211A'. With the construction as shown in FIG. 24, a compact optical pickup apparatus results by accommodating the light sources, the optical path separating means and the detecting means in the same package.

A variation of the optical pickup apparatus of FIG. 24 may be produced. More specifically, the optical axes of the beams from the light sources 201 and 202 may be aligned using the method already described. The polarizing hologram 240' may have an integral phase plate that operates as a ½ wave plate for one of the beams by rotating the plane of polarization by 90° and maintains the direction of polarization for the other beam.

A description will now be given of the aspects of the present invention directed to beam shaping.

FIG. 26A shows an optical pickup apparatus according to a sixth embodiment of the present invention. Referring to FIG. 26A, the optical pickup apparatus comprises a first light source (LD) 301 and a second light source (LD) 302. The first light source 301 is a semiconductor laser emitting a laser beam at a wavelength of 785 nm and the second light source 302 is also a semiconductor laser emitting a laser beam at a wavelength of 650 nm. The wavelength varies from laser to laser and also varies with temperature so that the actual wavelength may be variable by ±20 nm around the aforementioned wavelength.

The optical pickup apparatus further comprises a low-capacity optical disk 310 having a base thickness of 1.2 mm and a high-capacity optical disk 309 having a base thickness of 0.6 mm. For the purpose of description, the low-capacity optical disk 310 and the high-capacity optical disk 309 are illustrated to overlap each other.

The first light source 301 is driven when a writing operation or a reading operation (or a deletion operation) is performed in the low-capacity optical disk 310. A laser beam from the light source 301 is transmitted through a coupling lens 303, a beam shaping hologram element 304 and a beam splitter 305. The laser beam is then reflected by a deflecting prism 307 and incident on an objective lens 308. The objective lens 308 converges the incident beam. The converged beam is transmitted through the base of the low-capacity optical disk 310 so as to form a beam spot on a recording surface. The beam reflected by the recording surface is transmitted through the objective lens 308 and proceeds as a return beam. The return beam is reflected by the deflecting prism 307, transmitted through the beam splitter 305, reflected by the beam splitter 305, transmitted through a converging lens 311 and a cylindrical lens 312, and incident on a photosensitive means 313.

The light source 302 is driven when a writing operation or a reading operation (or a deletion operation) is performed in the high-capacity optical disk 309. A laser beam emitted by the light source 302 is transmitted through the coupling lens 303, the beam shaping hologram 304 and the beam splitter 305. The laser beam is then reflected by the deflecting prism 307 and incident on the objective lens 308. The objective lens 308 converges the incident beam. The converged beam is transmitted through the base of the high-capacity optical disk 309 so as to form a beam spot on a recording surface. The beam reflected by the recording surface is transmitted through the objective lens 308 and proceeds as a return beam. The return beam is reflected by the deflecting prism 307, transmitted through the beam splitter 305, reflected by the beam splitter 305, transmitted through the converging lens 311 and the cylindrical lens 312, and incident on a photosensitive means 313.

Irrespective of whether the optical disk 310 or the optical disk 309 is used, the return beam reflected by the beam splitter 305 is converged by the converging lens 311 and supplied by the cylindrical lens 312 with astigmatism before entering the photosensitive means 313. In the photosensitive means 313, a focus error signal is produced by a known method based on astigmatism and a tracking error signal is produced by a known method based on a phase difference. A servo controlling system (such as a microcomputer or a CPU not shown) 316 performs focusing control and tracking control based on the focus error signal and the tracking error signal, respectively. The photosensitive means 313 also outputs a readout signal.

The beam splitter 305 constitutes the optical path separating means provided for both the beam from the light source 301 and the beam from the light source 302. The converging lens 311, the cylindrical lens 312 and the photosensitive means 313 constitute the detecting means provided for both the beam from the light source 301 and the beam from the light source 302. The servo control system 316 constitutes the control means. A single lens having a convex spherical surface and a convex cylindrical surface may be used to replace the converging lens 311 and the cylindrical lens 312. The focusing control may alternatively performed using a known knife edge method or the like instead of the astigmatism method. The tracking control may alternatively performed using a push-pull method or another appropriate known method. The detecting means may appropriately constructed depending on which of these methods are employed to perform the focusing control and the tracking control.

Referring to FIG. 26A, the beam from the light source 301 or the light source 302 is reflected by the beam splitter 305 on its way to the optical disk and converged on a photosensitive means 315 via a converging lens 314. The photosensitive means 315 is provided to monitor an output of the light source. The output of the light sources is controlled in accordance with the output from the photosensitive means 315. When the output of the light source 301 or the light source 302 is controlled by monitoring the rear output of the light source, the converging lens 314 and the photosensitive means 315 are not necessary. However, the output control as shown in FIG. 26A using the converging lens 314 and the photosensitive means 315 enables a proper output control not affected by the return beam (in the optical arrangement of FIG. 26A, a portion of the return beam returns to the light source 301 or the light source 302). In order to avoid messiness in FIG. 26A, refraction of the beam due to the lens is neglected and the beam is depicted as a straight line. The coupling action of the coupling lens 303 is a collimating action with respect to the beam from the light source 301 or the light source 302.

FIG. 26B shows a laser beam emitted by the light source (the light source 301 or the light source 302). The laser beam emitted by the light source is divergent. Assuming that the direction parallel with the active layer 301A is the X direction and the direction perpendicular to the active layer 301A is the Y direction, the far field pattern of the emitted laser beam is elliptical such that the major axis of the ellipse is parallel with the Y direction. The direction of polarization of the laser beam emitted by the light source 301 or the light source 302 is defined as a direction of oscillation of the electric field of laser beam. The direction of oscillation may be parallel with the X direction or the Y direction. In semiconductor lasers generally available, the direction of polarization is parallel with the X direction. Since the oscillation of the electric field is parallel with the active layer 301A, such a semiconductor laser is described as providing a TE emission mode. When the direction of polarization is parallel with the Y direction, the direction of oscillation of the magnetic field of the laser beam is parallel with the active layer 301A. Such a semiconductor laser is described as providing a TM emission mode. A known semiconductor laser light source operated in the TM emission mode emits a beam at a wavelength of 635 nm.

The beam shaping hologram element 304 in the embodiment of FIG. 26A provides the following functions.

Assuming that the direction of the major axis of the far field pattern of the beam emitted by the light source 301 or the light source 302 is defined as the Y direction and the direction of the minor axis thereof of is defined as the X direction, as shown in FIG. 26B, the divergent beam emitted by the light source 301 or the light source 302 is coupled by the coupling lens 303 so as to be transformed into a parallel beam. The coupling lens 303 couples substantially the entirety of the beam from the light source 301 or the light source 302. Thus, the spatial intensity profile of the coupled beam has an elliptical pattern commensurate with the far field pattern. Thus, the major axis of that elliptical pattern matches the Y direction and the minor axis thereof matches the X direction. The parallel beam is incident on the beam shaping hologram element 304.

As shown in FIG. 26C, the beam shaping hologram element 304 transmits the incident beam in the Y direction. Accordingly, the beam diameter $D_B$ in the Y direction for a given intensity remains unchanged before and after the beam shaping hologram element 304. With regard to the X direction, the beam shaping hologram element 304 expands the incident beam diameter $D_{X1}$ for a given intensity to the exiting beam diameter $D_{X2}$.

The ratio between the minimum angle of divergence and the maximum angle of divergence of the laser beam emitted by the semiconductor laser depends on the type of the semiconductor laser. Typically, the ratio is in a range between 1:2 and 1:4.

The elliptical section of the beam from the light source 301 coupled by the coupling lens 303 and turned into a parallel beam is not necessarily the same as the corresponding section of the beam from the light source 302. Accordingly, the beam shaping hologram element 304 is controlled so that the diameters $D_B$ and $D_{x2}$ are substantially identical for the beams from the light sources 301 and 302.

As described above, the beam shaping hologram element 304 has the beam shaping function of converting the elliptical intensity profile of the beam from the light source 301 and the beam from the light source 302 into a circular profile. With such a beam shaping function, the beam transmitted through the beam shaping hologram element 304 has a substantially circular intensity profile, causing a substantially circular beam spot to be formed on the recording surface of the optical disk. Accordingly, high-capacity recording and reproduction can result. The beam shaping hologram element 304 requires less space than a prior art arrangement using a prism pair or a cylindrical lens. It is also easy to control the location of the beam shaping hologram 304. By using the beam shaping hologram element 304, a compact optical pickup apparatus can be produced.

Chromatic aberration produced in the coupling lens 303 due to a difference in wavelength of the beams from the light sources 301 and 302 does not pose a serious problem in practical applications. Of course, the coupling lens 303 may be formed as a junction lens formed by two lenses having different Abbe's number in order to correct the chromatic aberration.

The optical pickup apparatus of FIG. 26A is compatible with a first optical recording medium 310 adapted for a first wavelength for writing and reading and a second optical recording medium 309 adapted for a second wavelength for writing and reading. The apparatus of FIG. 26A comprises: a first light source 301 emitting a first beam at the first wavelength; a second light source 302 emitting a second beam at the second wavelength; a coupling lens 303 for coupling one of the first beam and the second beam; an objective lens 308 for converging the coupled beam so as to form a beam spot on a recording surface of one of the first optical recording medium and the second optical recording medium; an optical path separating means 305 for separating an optical path of a return beam reflected by the optical recording medium (309, 310) and transmitted through the objective lens 308, from an upstream optical path leading from the light source (309, 310) to the objective lens 308, the optical path separating means 305 being provided in alignment with both an upstream beam traveling to the recording surface and the return beam; detecting means 11, 12 and 13 for receiving the return beam separated by the optical path separating means 305 so as to retrieve information from the return beam, the detecting means being provided in alignment with both the upstream beam and the return beam and including photosensitive means; control means for effecting focusing control and tracking control based on a result of detection by the detecting means, a beam shaping hologram element 304 for transforming an elliptical intensity profile of the first beam and the second beam into a circular profile, wherein the first light source is driven only when the first optical recording medium 310 is used, the second light source is driven only when the second optical recording medium 309 is used.

The beam splitter 305 is used to embody the optical path separating means in the embodiment of FIG. 26A. However, this does not provide a satisfactorily high level of efficiency in using the beam.

Figure 27:
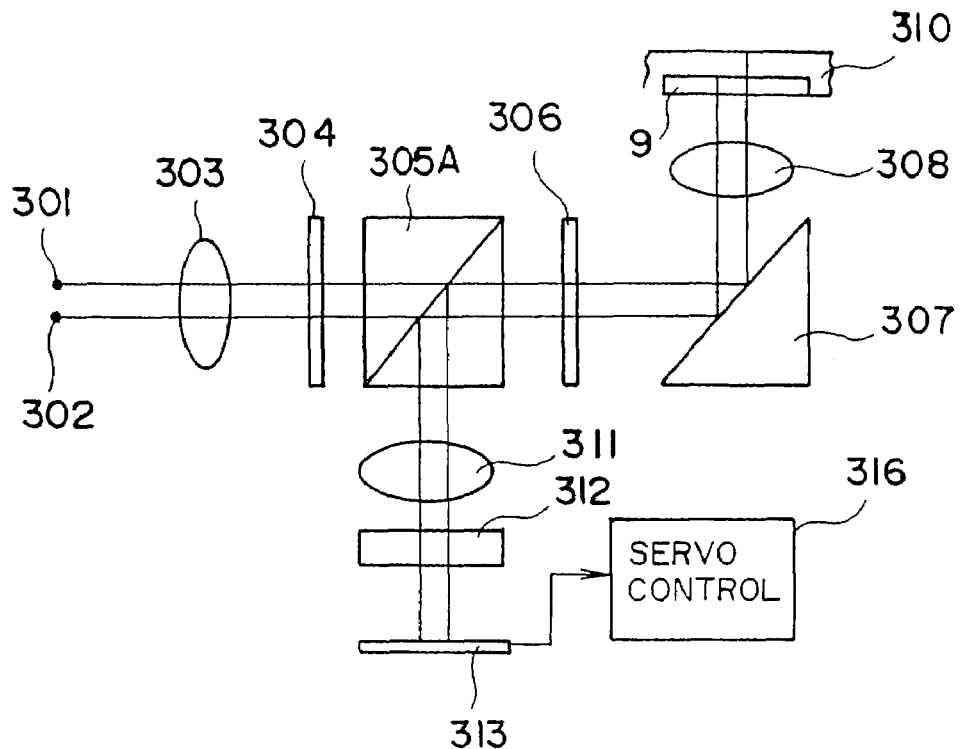
FIG. 27 shows a variation of the optical pickup apparatus of FIG. 26A.

FIG. 27 shows a variation of the optical pickup apparatus of FIG. 26A. In order to avoid messiness, those components that are similar to the corresponding components of FIG. 26A are designated by the same reference numeral. A difference between the apparatus of FIG. 26A and that of FIG. 27 is that the polarizing beam splitter 305A and the phase plate 306 are used to embody the optical path separating means.

The laser beam emitted by the light source 301 or the light source 302 is transformed by the coupling lens 303 into a parallel beam. The parallel beam is subject to beam shaping by the beam shaping hologram element 304 and incident on the polarizing beam splitter. The light sources 301 and 302 operate in the same emission mode. The direction of polarization of the emitted beam is parallel with the surface of the paper. The emitted beam is P-polarized with respect to the polarization filter film of the polarizing beam splitter 305A. Therefore, the laser beam from the light source is transmitted through the polarizing beam splitter 305A. The beam transmitted through the polarizing beam splitter 305A is then transmitted through the phase plate 306 which transforms the transmitted beam from a linearly-polarized beam into a circularly-polarized beam. The beam exiting the phase plate 306 is deflected by the deflecting prism 307 and converged by the objective lens 308 so as to form a beam spot on the recording surface of the optical disk 309 (in case the light source 302 is driven) or the optical disk 310 (in case the light source 301 is driven). The beam reflected by the recording surface is transmitted through the objective lens 308 and proceeds as a return beam. The return beam is reflected by the deflecting prism 307 and transmitted through the phase plate 306 so as to be transformed into a linearly-polarized beam polarized in a direction perpendicular to the direction of polarization of the beam on an upstream path. The linearly-polarized beam is incident on the polarizing beam splitter 305A. The beam incident on the polarizing beam splitter 305A is S-polarized so that the beam is reflected by the polarizing beam splitter 305A and incident on the photosensitive means 313 via the converging lens 311 and the cylindrical lens 312.

In this construction, the polarizing beam splitter 305A transmits substantially 100% of the P-polarized beam and reflects substantially 100% so that the efficiency in using the beam is high. Particularly, since the beam shaping hologram element 304 effects beam shaping such that substantially the entirety of the beam from the light source is used for writing, reading and deletion, the efficiency in using the beam is significantly improved over that of the prior art. The polarizing beam splitter 305A cannot separate the beam for monitoring purpose so that the output control of the light sources is performed by monitoring the rear output of the light sources.

The phase 306 functions as a ¼ wave plate for the beams at different wavelength from the light sources 301 and 302. Such a phase plate is implemented as described below.

It is assumed that the refractive index provided by a birefringent material forming the phase plate 306 with respect to the ordinary ray at a wavelength $\lambda_1$ (785 nm in the example assumed in the description) is indicated by $N_{O1}$ and that of the extraordinary ray is indicated by $N_{E1}$. The refractive index with respect to the ordinary ray at a wavelength $\lambda_2$ (650 nm in the example assumed in the description) is indicated by $N_{O2}$ and that of the extraordinary ray is, indicated by $N_{E2}$. Assuming that the thickness of the birefringent material is indicated by d, a phase difference $\delta(\lambda_1)$ between the ordinary ray and the extraordinary ray at $\lambda_1$ transmitted through the birefringent material and a phase difference $\delta(\lambda_2)$ at $\lambda_2$ are given by $$\delta(\lambda_1)=(2\pi/\lambda_1)(N_{O1}-N_{E1})d$$

$$\delta(\lambda_2)=(2\pi/\lambda_2)(N_{O2}-N_{E2})d$$

In order for the birefringent material layer to act as a ¼ wave plate for the beams at different wavelength, the thickness d should be determined so as to meet the following condition.

$$\delta(\lambda_1)=(2n+1)\delta(\lambda_2)=(2N+1)(\pi/2)$$

where n and N indicate natural numbers. The birefringent material may be lithium niobate (LiNbO$_3$). Alternatively, the phase plate may be formed as a vapor-deposited phase difference film formed of magnesium fluoride (MgF$_2$).

Thus, the optical pickup apparatus of FIG. 27 is provided with the phase plate 306 that provide a predetermined phase difference (¼ of the wavelength) to the beams from the light sources 301 and 302.

In the apparatus of FIG. 27, the light sources 301 and 302 operate in the same emission mode. Alternatively, the light sources 301 and 302 may operate in difference emission modes.

Figure 28:
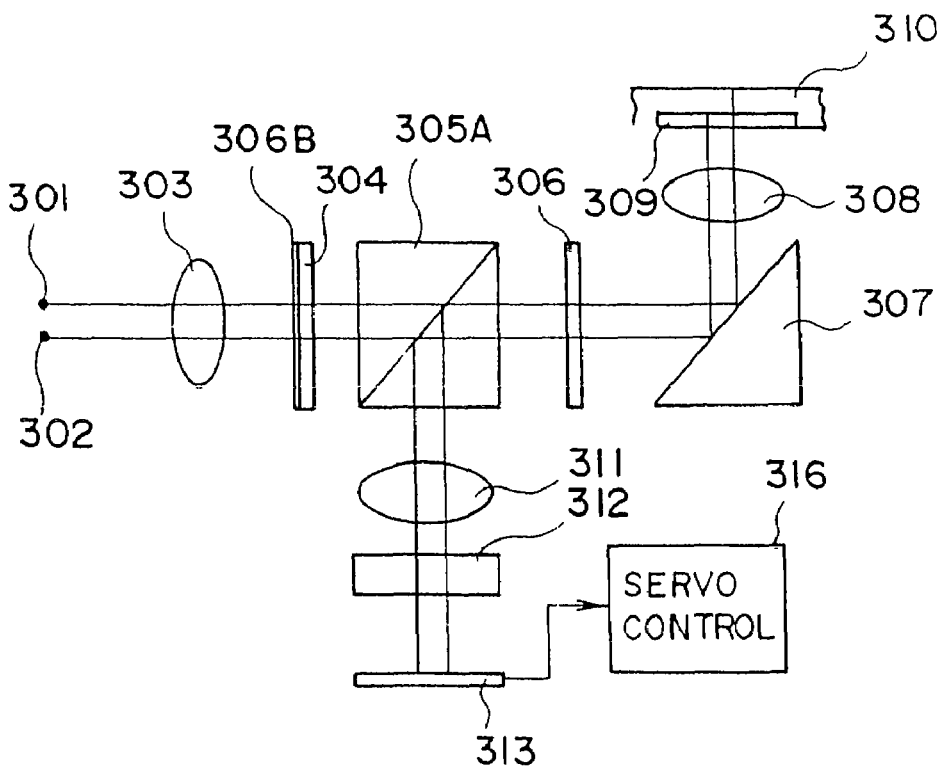
FIG. 28 shows another variation of the optical pickup apparatus of FIG. 26A.

FIG. 28 shows another variation of the optical pickup apparatus of FIG. 26A including such light sources.

The light source 301 emits at a wavelength 785 nm in the TE emission mode. The light source 302 emits at a wavelength 635 nm in the TM emission mode. In this case, the high-capacity optical disk 310 must be compatible with the wavelength 635 nm.

The difference between the TE emission mode and the TM emission mode resides in the direction of polarization with respect to the direction of the major axis of the far field pattern. As described with reference to FIG. 26B, assuming that the direction of the major axis of the far field pattern FF is the Y direction, the direction of polarization in the TE emission mode is the X direction and that in the TM emission mode is the Y direction. Referring to FIG. 28, by orienting the direction of the major axis of the far field pattern so as to align the direction perpendicular to the paper, the laser beam from the light source 302 should have the plane of polarization thereof rotated by 90° before being incident on the polarizing beam splitter 305A because the laser beam from the light source 302 emitting in the TM emission mode is S-polarized with respect to the polarization filter film of the polarizing beam splitter 305A.

A phase plate 306B integrally coupled to the beam shaping hologram element 304 performs the above-mentioned orientation. The phase plate 306B produces a phase difference, which is an integral multiple of the wavelength, to the beam from the light source 301 and produces a phase difference, which is half of an integral multiple of the wavelength, to the beam from the light source 302. Due to such an optical performance, only the beam from the light source 302 has the direction of polarization thereof rotated by 90° when transmitted through the phase plate 306B. With this, the beam from the light source 302 can be transmitted through the polarizing beam splitter 305A. The operation of the elements constituting the apparatus of FIG. 28 is the same as the operation of the corresponding elements of FIG. 27.

Thus, the optical pickup apparatus shown in FIG. 28 is provided the phase plates 306 and 306B which provide respective phase differences to the beam from the light source 301 or the light source 302. The phase plate 306B provides a phase difference, which is half an integral multiple of the wavelength, to the beam from one of the light sources and provides a phase difference, which is integral multiple of the wavelength, to the beam from the other light source.

The beam shaping hologram element 304 used in the apparatus shown in FIGS. 26A, 27 and 28 may be an ordinary hologram element. Alternatively, the beam shaping hologram element 304 may be a polarizing hologram.

The phase plate 306B of the apparatus of FIG. 28 transmits the beam from the light source 301 while maintaining the direction of polarization thereof and acts as a ½ wave plate for the beam from the light source 302. Such a phase plate is implemented as described below.

It is assumed that the refractive index provided by a birefringent material forming the phase plate 306B with respect to the ordinary ray at a wavelength $\lambda_1$ (785 nm in the example assumed in the description) is indicated by $N_{O1}$ and that of the extraordinary ray is indicated by $N_{E1}$. The refractive index with respect to the ordinary ray at a wavelength $\lambda_2$ (635 nm in the example assumed in the description) is indicated by $N_{O2}$ and that of the extraordinary ray is indicated by $N_{E2}$. Assuming that the thickness of the birefringent material is indicated by d, a phase difference $\delta(\lambda_1)$ between the ordinary ray and the extraordinary ray at $\lambda_1$ transmitted through the birefringent material and a phase difference $\delta(\lambda_2)$ at $\lambda_2$ are given by $$\delta(\lambda_1)=(2\pi/\lambda_1)(N_{O1}-N_{E1})d$$

$$\delta(\lambda_2)=(2\pi/\lambda_2)(N_{O2}-N_{E2})d$$

In order for the birefringent material layer to act as a $\lambda$ plate for the beam at the wavelength 785 nm and as a ½ wave plate for the beam at the wavelength 635 nm, the thickness d should be determined so as to meet the following conditions.

$$\delta(\lambda_1)=2N\pi, \delta(\lambda_2)=(2n+1)\pi$$

The birefringent material may be lithium niobate (LiNbO$_3$). Alternatively, the phase plate may be formed as a vapor-deposited phase difference film formed of magnesium fluoride (MgF$_2$). It is assumed that the MgF$_2$ film is used in the apparatus of FIG. 28.

Of course, the phase plate 306B of FIG. 28 may be constructed so as to operate as a $\lambda$/2 plate for the beam from the light source 301 and as a $\lambda$ plate for the beam from the light source 302.

Figure 29A:
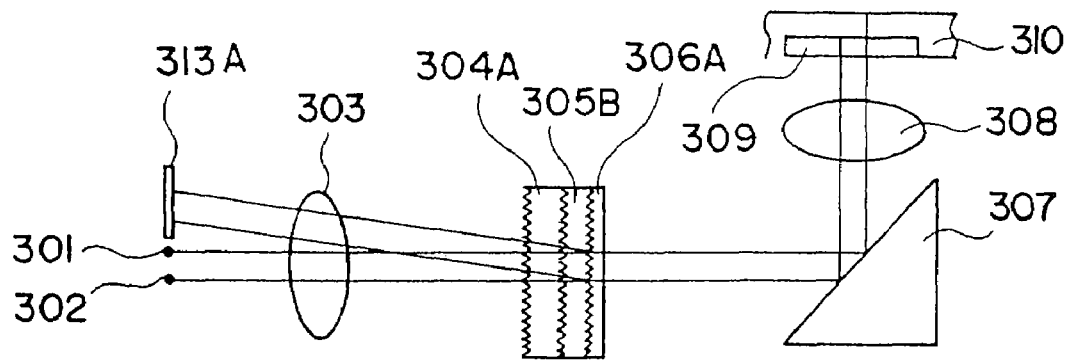
FIG. 29A shows still another variation of the optical apparatus of FIG. 26A.

FIG. 29A shows still another variation of the optical apparatus of FIG. 26A. A polarizing hologram is used to embody a beam shaping hologram element 304A. The optical path separating means is embodied by an optical path separating hologram element 305B of the polarizing hologram. A phase plate 306A provides a predetermined phase difference (an odd multiple of 90°) to the beams from the light sources 301 and the light source 302.

The polarizing hologram is characterized by a variable optical action that depends on the polarization of the incident beam. Assuming that the light sources 301 and 302 are operated in the same emission mode and the direction of polarization of the beams is parallel with the paper, the beam shaping hologram element 304A embodied by the polarizing hologram acts as a beam shaping hologram for the beam polarized in a direction parallel with the paper but does not act as a beam shaping hologram for the beam polarized in a direction perpendicular to the paper. That is, the latter beam is transmitted through the beam shaping hologram element 304A.

In contrast, the optical path separating hologram element 305B formed by the polarizing hologram transmits the beam polarized in a direction parallel with the paper and provides a diffractive action to the beam polarized in a direction perpendicular to the paper.

Therefore, when the beam from the light source 301 or the light source 302 is transformed into a parallel beam by the coupling lens 303, the beam is shaped by the beam shaping hologram element 304A and transmitted through the optical path separating hologram element 305B. The beam from the optical path separating hologram element 305B is transformed into a circularly-polarized beam by the phase plate 306A (acting as a λ/4 plate for the beams from the light sources 301 and 302). The beam exiting the phase plate 306A is illuminate the optical disk 309 or the optical disk 310 via the deflecting prism 307 and the objective lens 308.

The return beam transmitted through the phase plate 306a is polarized in a direction perpendicular to the beam on an upstream path (that is, in a direction perpendicular to the paper). The beam from the phase plate 306A is subject to a hologram action of the optical path separating hologram element 305B so as to be deflected toward a photosensitive means 313A. The coupling lens 303 converges the beam on the photosensitive means 313A.

Figure 29B:
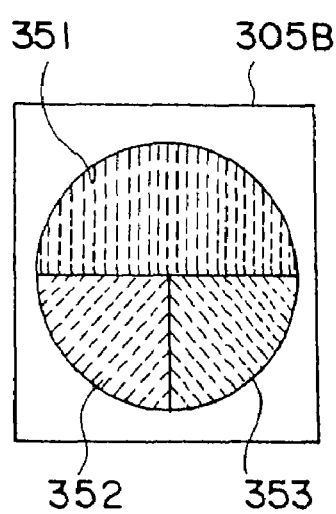
FIG. 29B shows a construction of an optical path separating hologram element.
Figure 29C:
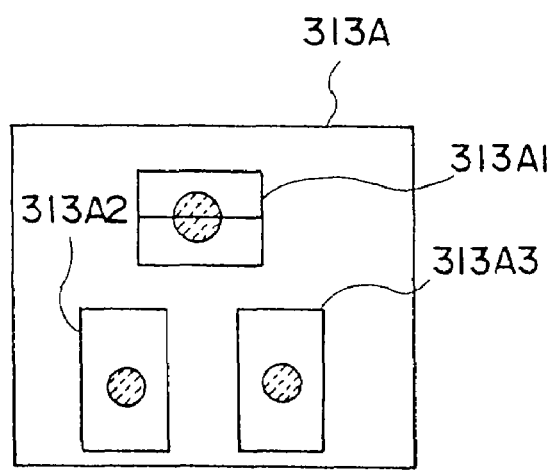
FIG. 29C shows a construction of a photosensitive means.

Referring to FIG. 29B, the optical path separating hologram element 305B implemented by the polarizing hologram comprises three hologram portions 351, 352 and 353 providing different diffractive actions. The return beam portion incident on the hologram portion 351 is incident on a bisected photosensitive portion 313A1 of the photosensitive means 313A shown in FIG. 29C. The return beam portions incident on the hologram portions 352 and 353 are incident on the photosensitive portions 313A2 and 313A3, respectively. The incident beams are converged by the coupling lens 303 on respective photosensitive portions.

Straight-edged borders of the hologram portions 351, 352 and 353 of the optical path separating hologram element 305B function as knife edges in the focusing control according to the knife edge method. The focus error signal for focusing control is formed as a difference between outputs from the respective photosensitive portions of the bisected photosensitive portions 313A1.

The tracking error signal for tracking control is formed as a difference between outputs from the photosensitive portions 313A2 and 313A3. Of course, the readout signal is obtained in the form of a sum (or a portion thereof) of outputs from the photosensitive portions 313A1, 313A2 and 313A3.

Figure 29D:
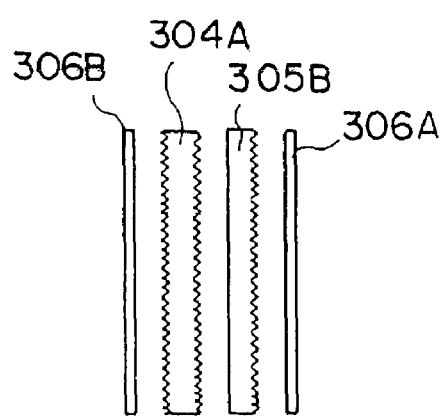
FIG. 29D shows how a phase plate is provided to precede a beam shaping hologram element and face light sources.

In the apparatus of FIG. 29A, it is assumed that the light sources 301 and 302 operate in the same emission mode. If one of the light sources 301 and 302 is operated in the TE emission mode and the other is operated in the TM emission mode, the phase plate 306B is constructed to operate as a λ plate for one of the beams and as a λ/2 plate for the other beam so that the beams from the light sources 301 and 302 are polarized in the same direction before being incident on the beam shaping hologram element 304A. The phase plate 306B thus constructed is provided to precede the beam shaping hologram element 304A and face the light sources, as shown in FIG. 29D. Alternatively, as shown in FIG. 29E, the phase plate 306B, the beam shaping hologram element 304A, the optical path separating hologram element 305B and the phase plate 306A may be integrally formed.

Figure 29E:
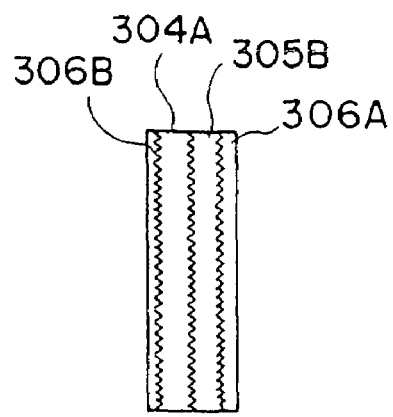
FIG. 29E shows how a phase plate, a beam shaping hologram element, an optical path separating hologram element and a phase plate are integrally formed.

In the construction of FIGS. 29D and 29E, the beam shaping hologram element 304A and the optical path separating hologram element 305B are embodied by polarizing holograms. The phase plates 306A and 306B are formed to be integral with the polarizing holograms.

Referring back to FIGS. 26A, 27, 28 and 29A, the coupling lens 303 of collimates the beams from the light sources 301 and 302, and the hologram element is disposed at a position at which the beam from the light source 301 or the light source 302 is transformed into a parallel beam.

The beam shaping function of the beam shaping hologram element of the invention is defined as transforming an elliptical intensity profile of the beams from the first and second light sources into a generally circular profile. Therefore, the beam shaping hologram element may not necessarily be disposed at a position at which the beam from the light source is transformed into a parallel beam. The same is true of the location of the optical path separating hologram element.

Figure 30:
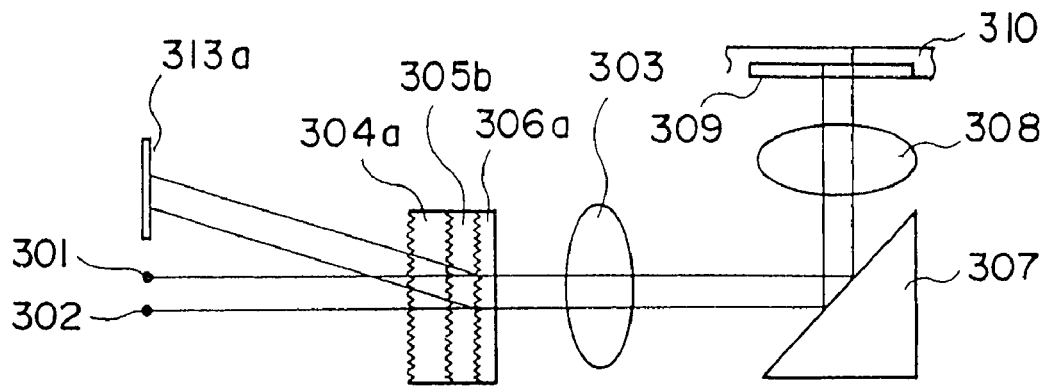
FIG. 30 shows yet another variation of the optical pickup apparatus of FIG. 26A.

FIG. 30 shows yet another variation of the optical pickup apparatus of FIG. 26A. Hologram elements (polarizing holograms) including a beam shaping hologram element 304a and an optical path separating hologram element 305b are formed to be integral with each other and disposed on an optical path leading from the first and second light sources 301 and 302 to the coupling lens 303. The hologram elements are also formed to be integral with a phase plate 306a operating as a λ/4 plate for the beam from the light source. The phase plate 306a is formed to be integral with the optical path separating hologram element 305b in the form of a vapor-deposited phase difference film.

In the optical pickup apparatus of FIG. 30, the diverging laser beam from the light source 301 or the light source 302 is incident on the beam shaping hologram element 304a for beam shaping. The beam shaping action is such that the angle of divergence in the direction (X direction) of the major axis of the far field pattern FF shown in FIG. 26B is increased so as to approach the angle of divergence in the direction (Y direction) of the major axis. As a result of beam shaping, the beam has a generally circular intensity profile so as to form a circular or a nearly-circular elliptical beam spot on the recording surface of the optical disk.

The return beam transmitted through the coupling lens 303 and converged thereby is then transmitted through the phase plate 306a so as to be transformed into a linearly-polarized beam polarized in a direction at right angles with the beam on an upstream path. Due to the diffractive action provided by the optical path separating hologram element 305b, the optical path of the return beam is separated from the upstream optical path. That is, the return beam is transmitted through the beam shaping hologram element 304a without being subject to the diffractive action thereby and is converged on the photosensitive means 313a.

Since the optical path separation occurs in the neighborhood of the light sources 301 and 302, the photosensitive means 313a may be disposed in the neighborhood of the light sources 301 and 302. The description already given with reference to FIGS. 29B and 29C applies to the optical path separating hologram element 305b and the photosensitive means 313a. When the light sources 301 and 302 differ in emission mode (that is, when one of the light sources is operated in the TE emission mode and the other in the TM emission mode), a phase plate (similar to the phase plate 306B) operating as a λ plate for the beam from one of the light sources and as a λ/2 plate for the other beam may be provided adjacent to the beam shaping hologram element 304a so as to face the light sources. Of course, such a phase plate may be formed as a vapor-deposited phase difference film on the beam shaping hologram element 304a.

Figure 31A:
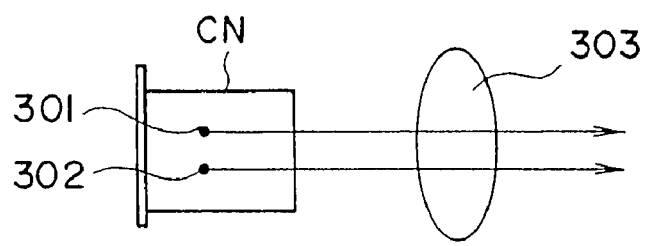
FIG. 31A shows light sources accommodated in the same can.

Referring back to FIGS. 26A, 27, 28, 29A and 30, the interval between the light sources 301 and 302 is shown with an exaggeration. In practice, the light sources 301 and 302 are provided close to each other. As shown in FIG. 31A, the light sources 301 and 302 may be accommodated in the same can CN.

The light sources as shown in FIG. 31A can be used in any of the apparatus described with reference to FIGS. 26A-30.

Figure 31B:
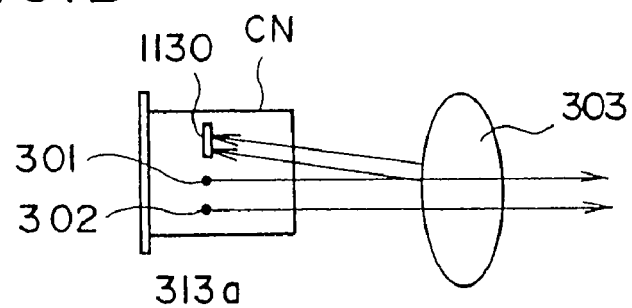
FIG. 31B shows an arrangement wherein the light sources and a photosensitive means are accommodated in the same can.

FIG. 31B shows an arrangement wherein the light sources 301 and 302, and a photosensitive means 1130 are accommodated in the same can CN. The construction of FIG. 31B may be applied to the apparatus of FIGS. 29A and 30.

Figure 31C:
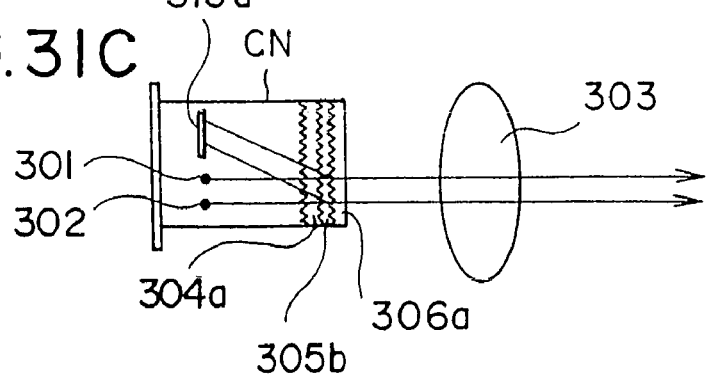
FIG. 31C shows an arrangement wherein the light sources and a photosensitive means are accommodated in the same can.

FIG. 31C shows an arrangement wherein the light sources 301 and 302, and a photosensitive means 1130a are accommodated in the same can CN. Moreover, a hologram element (the beam shaping hologram element 304a and the optical path separating hologram element 305b) and the phase plate 306a are formed to be integral with the can CN. With this construction, a compact optical pickup apparatus results.

In the apparatus described with reference to FIG. 26A-31C, the optical axes of the laser beams from the light sources 301 and 302 do not match so that the location at which the return beam originating in the light source 301 is incident on the photosensitive means is different from that of the return beam originating in the light source 302. For this reason, it is necessary to provide an offset, commensurate with a displacement of the locations of incidence, to the focus error signal and the tracking error signal or to provide a photosensitive means independently for each return beam. Alternatively, the location of the photosensitive portion of the photosensitive means may be controlled depending on whether the light source 301 or the light source 302 is driven so as to ensure that the return beam is incident on the proper location of the photosensitive means 313.

In order to avoid the cumbersomeness of the above-described arrangement, an optical axis aligning means for aligning the optical axes of the beams from the light sources 301 and 302 with the optical axis of the coupling lens, and for aligning the orientation of the far-field patterns of the beams may be provided. Any of a variety of such optical axis aligning means for a variety of optical apparatuses may be appropriately used for the apparatus of the present invention. Four examples of the optical axis aligning means will be described below.

Figure 32A:
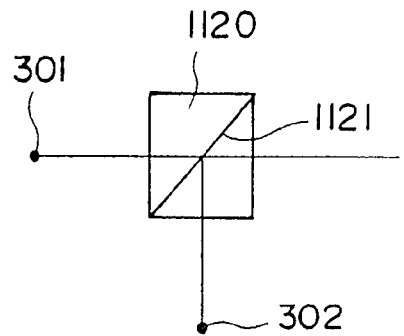
FIG. 32A shows an optical axis aligning means.

FIG. 32A shows an arrangement wherein the optical axes of the laser beams from the light sources 301 and 302 are aligned using a combination prism 1120. The combination prism 1120 is provided with a separation film 1121 which transmits substantially the entirety of the laser beam from the light source 301 and reflects substantially the entirety of the laser beam from the light source 302.

The separation film 1121 has a variety of implementations.

Considering the fact that the light sources 301 and 302 differ in wavelength at which emission occurs, a known dichroic filter film may be used to implement the separation film 1121. Assuming that the emission wavelength of the light source 301 is 785 nm and the emission wavelength of the light source 302 is 650 nm, the optical characteristic of the dichroic film may be controlled to transmit the beam at the wavelength 785 nm and reflect the beam at the wavelength 650 nm.

The separation film 1121 may be implemented by a polarizing separation film. In this case, the combination prism 1120 is a polarizing beam splitter. For example, if the light source 301 is operated in the TE emission mode and emits a laser beam polarized on a plane parallel with the paper and if the light source 302 is operated in the TM emission mode and emits a laser beam polarized on a plane perpendicular to the paper, the laser beam from the light source 301 is transmitted through the separation film 1121 and the laser beam from the light source 302 is reflected by the separation film 1121. Accordingly, the optical axes of the laser beams from the light sources are aligned with the optical axis of the coupling lens such that the far field pattern of the beams have the same orientation (in this case, the direction of the major axis of the far field pattern is perpendicular to the paper).

Figure 32B:
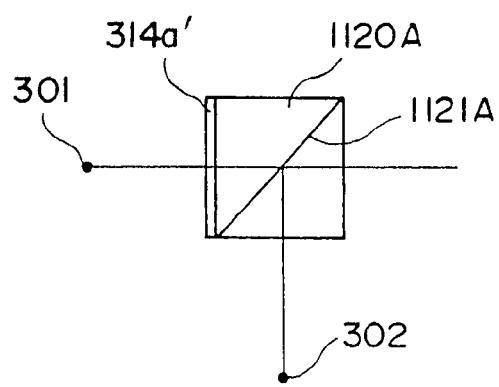
FIG. 32B shows another optical axis aligning means adapted for an arrangement wherein the light sources are operated in the same emission mode.

FIG. 32B shows another optical axis aligning means adapted for an arrangement wherein the light sources 301 and 302 are operated in the same emission mode (for example, the TE emission mode). The optical axis aligning means is implemented by a combination of a polarizing beam splitter 1120A and a phase plate 314a1 formed to be integral with each other. When the light sources 301 and 302 are arranged so that the direction of the minor axis of the far field pattern of the laser beams from the light sources 301 and 302 is perpendicular to the paper, the laser beams are polarized in a direction perpendicular to the paper. The phase plate 314a1 operating as a λ/2 plate rotates the direction of polarization of the laser beam from the light source 301 by 90°. With this construction, the laser beam from the light source 301 is transmitted through the polarizing separation film 1121A and the laser beam from the light source 302 is reflected by the polarizing separation film 1121A. Thus, the optical axes of the beams from the light sources are aligned with the optical axis of the coupling lens such that the far field patterns of the beams have the same orientation.

Figure 32C:
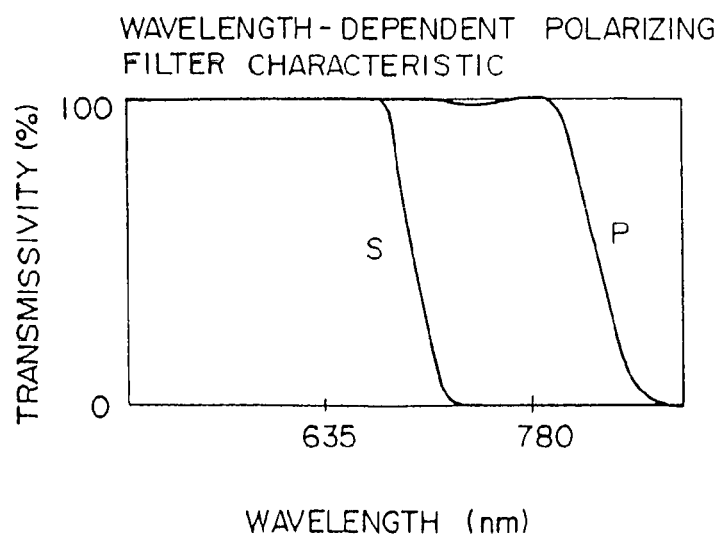
FIG. 32C is a graph showing a wavelength-dependent polarization filter characteristic of a separation film of the optical axis aligning means of FIG. 32A.

The separation film 1121 of the combination prism 1120 of FIG. 32A may have a wavelength-dependent polarization filter characteristic as shown in FIG. 32C so as to implement the optical axis aligning means. Assuming that the light source 301 emits at a wavelength of 785 nm and the light source 302 emits at a wavelength of 650 nm, and assuming that the S-polarized laser beam from the light source 301 or 302 is incident on the separation film, substantially 100% of the laser beam from the light source 301 (wavelength: 785 nm) is reflected by the separation film and substantially 100% of the beam from the light source 302 (wavelength: 650 nm) is transmitted through the separation film. By constructing the combination prism 1120 of FIG. 32A so as to have the wavelength-dependent polarization filter characteristic as shown in FIG. 32C, by exchanging the locations of the light sources 301 and 302 in FIG. 32A, and by ensuring that the laser beams from the light sources 301 and 302 are S-polarized with respect to the separation film 1121 (this arrangement corresponds to controlling the direction of the major axis of the far field pattern of the beams from the light sources operated in the same emission mode to be parallel with each other), the optical axes of the beams from the light sources are aligned with the optical axis of the coupling lens such that the far field patterns of the beams have the same orientation.

Any other known method may be used to align the optical axes of the beams from the light sources 301 and 302.

FIG. 33 shows a construction of the optical axis aligning means according to a variation. The first and second light sources 301 and 302 are accommodated in the same can CN1. The combination prism 1120 embodying the optical axis aligning means described with reference to FIG. 32A is provided in the can CN1. Such a light source package may be used as a light source unit for the apparatus described with reference to FIGS. 26A-30. In addition to the light sources 301, 302 and the optical axis aligning means 1121, the photosensitive portions of the detecting means may be provided in the can CN1. Such a construction can be used as a combined light source and photosensitive means unit for the apparatuses as shown in FIGS. 29A and 30. The hologram element and the phase plate may be formed to be integral with the can CN1, as shown in FIG. 31C. Of course, the optical axis aligning means of another implementation may be provided in the can.

The present invention is not limited to the above described embodiments, and variations and modifications may be made without departing from the scope of the present invention.

What is claimed is:

1. An optical pickup apparatus compatible with a first optical recording medium adapted for a first wavelength for writing and reading and a second optical recording medium adapted for a second wavelength for writing and reading, comprising:

a first light source emitting a first beam at the first wavelength;

a second light source emitting a second beam at the second wavelength;

a coupling lens for coupling one of the first beam and the second beam;

an objective lens for converging the coupled beam so as to form a beam spot on a recording surface of one of the first optical recording medium and the second optical recording medium;

optical path separating means for separating a return beam reflected by the optical recording medium and transmitted through the objective lens, from an upstream optical path leading from the light source to the objective lens, the optical path separating means being provided in alignment with both an upstream beam traveling to the recording surface and the return beam;

detecting means for receiving the return beam separated by the optical path separating means so as to retrieve information from the return beam, the detecting means being provided in alignment with both the upstream beam and the return beam and including photosensitive means; and control means for effecting focusing control and tracking control based on a result of detection by the detecting means, wherein:

the first light source is driven only when the first optical recording medium is used, the second light source is driven only when the second optical recording medium is used, the coupling lens comprises an anamorphic lens which provides a beam shaping function for shaping one of the first beam and the second beam, the shaping including less expansion in a direction in which an angle of divergence with respect to intensity of the beam from the light source is maximum and more expansion in a direction in which the angle of divergence is minimum, and wherein the coupling lens is provided with a collimating function for collimating one of the first beam and the second beam, the coupling lens being a single lens that provides the collimating function and the beam shaping function.

2. The optical pickup apparatus as claimed in claim 1, further comprising: optical axis aligning means for aligning optical axes of the first beam and the second beam with an optical axis of the coupling lens.

3. The optical pickup apparatus as claimed in claim 2, wherein the optical axis aligning means comprises a prism element having a one of variable transmissivity and a variable reflectivity that depends on a wavelength of the beam.

4. The optical pickup apparatus as claimed in claim 1, the first and second light sources are accommodated in the same package.

5. The optical pickup apparatus as claimed in claim 1, wherein the first light source emits a beam at a wavelength of 785 nm, the second light source emits a beam at a wavelength of 650 nm, the first optical recording medium is a low-capacity optical disk having a base thickness of 1.2 mm and the second optical recording medium is a high-capacity optical disk having a base thickness of 0.6 mm.

6. The optical pickup apparatus as claimed in claim 1, wherein one of the first light source and the second light source provides a TE-mode emission and the other light source provides a TM-mode emission.

\* \* \* \* \*